United States Patent
Rigby

(10) Patent No.: US 11,736,616 B1
(45) Date of Patent: Aug. 22, 2023

(54) METHOD AND APPARATUS FOR AUTOMATICALLY TAKING ACTION BASED ON THE CONTENT OF CALL CENTER COMMUNICATIONS

(71) Applicant: Talkdesk, Inc., San Francisco, CA (US)

(72) Inventor: Ben Rigby, San Francisco, CA (US)

(73) Assignee: Talkdesk, Inc., San Francisco, CA (US)

(*) Notice: Subject to any disclaimer, the term of this patent is extended or adjusted under 35 U.S.C. 154(b) by 0 days.

(21) Appl. No.: 17/826,917

(22) Filed: May 27, 2022

(51) Int. Cl.
*H04M 3/523* (2006.01)

(52) U.S. Cl.
CPC .................. *H04M 3/5235* (2013.01)

(58) Field of Classification Search
CPC .................................... H04M 3/5235
USPC ............ 379/265.13, 265.11, 265.12, 266.01, 379/265.05, 265.01
See application file for complete search history.

(56) References Cited

U.S. PATENT DOCUMENTS

| | | | |
|---|---|---|---|
| 5,862,203 | A | 1/1999 | Wulkan et al. |
| 5,897,616 | A | 4/1999 | Kanevsky et al. |
| 5,966,691 | A | 10/1999 | Kibre et al. |
| 5,970,124 | A | 10/1999 | Csaszar et al. |
| 6,100,891 | A | 8/2000 | Thorne |

(Continued)

FOREIGN PATENT DOCUMENTS

| | | |
|---|---|---|
| EP | 1 418 519 A1 | 5/2004 |
| JP | 5986065 B2 | 9/2016 |

(Continued)

OTHER PUBLICATIONS

Gaietto, Molly., "What is Customer DNA?",—NGDATA Product News, Oct. 27, 2015, 10 pages.

(Continued)

*Primary Examiner* — Thjuan K Addy
(74) *Attorney, Agent, or Firm* — Rimon PC; Marc S. Kaufman

(57) ABSTRACT

A method and system for automatically executing an action within a call center environment. Data is aggregated from multiple data sources into a combined data stream. One of the data sources is a source of data corresponding to at least one communication processed by the call center one of the data sources can be a source of external data representing activity that is external to the call center. The combined data stream is processed into successive batches of data corresponding to one or more communications between a call center agent and a communicating party received by the call center. A sensor data structure specifying at least one rule is applied to the batches of data. The at least one rule can include a machine learning model and a configuration data structure based on historical data from the multiple data sources. When it is determined that at least one of the batches satisfies the at least one rule, a notification message relating to the one or more communications is generated. The call center executes an action specified by the sensor data structure based on the notification message. The action can address a situation corresponding the at least one communication. The actions can be various actions such as notifying a specified party, generating an API call, or the like.

8 Claims, 12 Drawing Sheets

(56) References Cited

U.S. PATENT DOCUMENTS

| | | |
|---|---|---|
| 6,128,415 A | 10/2000 | Hultgren et al. |
| 6,163,607 A | 12/2000 | Bogart et al. |
| 6,230,197 B1 | 5/2001 | Beck et al. |
| 6,263,057 B1 | 7/2001 | Silverman |
| 6,345,093 B1 | 2/2002 | Lee et al. |
| 6,385,584 B1 | 5/2002 | McAlister et al. |
| 6,411,687 B1 | 6/2002 | Bohacek et al. |
| 6,493,695 B1 | 12/2002 | Pickering et al. |
| 6,560,222 B1 | 5/2003 | Pounds et al. |
| 6,587,831 B1 | 7/2003 | O'Brien |
| 6,639,982 B1 | 10/2003 | Stuart et al. |
| 6,721,416 B1 | 4/2004 | Farrell |
| 6,754,333 B1 | 6/2004 | Flockhart et al. |
| 6,859,776 B1 | 2/2005 | Cohen et al. |
| 6,970,829 B1 | 11/2005 | Leamon |
| 7,023,979 B1 | 4/2006 | Wu et al. |
| 7,076,047 B1 | 7/2006 | Brennan et al. |
| 7,110,525 B1 | 9/2006 | Heller et al. |
| 7,209,475 B1 | 4/2007 | Shaffer et al. |
| 7,274,787 B1 | 9/2007 | Schoeneberger |
| 7,292,689 B2 | 11/2007 | Odinak et al. |
| 7,343,406 B1 | 3/2008 | Buonanno et al. |
| 7,372,952 B1 | 5/2008 | Wu et al. |
| 7,382,773 B2 | 6/2008 | Schoeneberger et al. |
| 7,409,336 B2 | 8/2008 | Pak et al. |
| 7,426,268 B2 | 9/2008 | Walker et al. |
| 7,466,334 B1 | 12/2008 | Baba |
| 7,537,154 B2 | 5/2009 | Ramachandran |
| 7,634,422 B1 | 12/2009 | Andre et al. |
| 7,657,263 B1 | 2/2010 | Chahrouri |
| 7,672,746 B1 | 3/2010 | Hamilton et al. |
| 7,672,845 B2 | 3/2010 | Beranek et al. |
| 7,676,034 B1 | 3/2010 | Wu et al. |
| 7,698,163 B2 | 4/2010 | Reed et al. |
| 7,752,159 B2 | 7/2010 | Nelken et al. |
| 7,774,790 B1 | 8/2010 | Jirman et al. |
| 7,788,286 B2 | 8/2010 | Nourbakhsh et al. |
| 7,853,006 B1 | 12/2010 | Fama et al. |
| 7,864,946 B1 | 1/2011 | Fama et al. |
| 7,869,998 B1 | 1/2011 | Di Fabbrizio et al. |
| 7,949,123 B1 | 5/2011 | Flockhart et al. |
| 7,953,219 B2 | 5/2011 | Freedman et al. |
| 7,966,369 B1 | 6/2011 | Briere et al. |
| 8,060,394 B2 | 11/2011 | Woodings et al. |
| 8,073,129 B1 | 12/2011 | Kalavar |
| 8,116,446 B1 | 2/2012 | Kalavar |
| 8,135,125 B2 | 3/2012 | Sidhu et al. |
| 8,160,233 B2 | 4/2012 | Keren et al. |
| 8,184,782 B1 | 5/2012 | Vatland et al. |
| 8,223,951 B1 | 7/2012 | Edelhaus et al. |
| 8,229,761 B2 | 7/2012 | Backhaus et al. |
| 8,243,896 B1 | 8/2012 | Rae |
| 8,300,798 B1 | 10/2012 | Wu et al. |
| 8,369,338 B1 | 2/2013 | Peng et al. |
| 8,370,155 B2 | 2/2013 | Byrd et al. |
| 8,391,466 B1 | 3/2013 | Noble, Jr. |
| 8,447,279 B1 | 5/2013 | Peng et al. |
| 8,488,769 B1 | 7/2013 | Noble et al. |
| 8,526,576 B1 | 9/2013 | Deich et al. |
| 8,535,059 B1 | 9/2013 | Noble, Jr. et al. |
| 8,583,466 B2 | 11/2013 | Margulies et al. |
| 8,594,306 B2 | 11/2013 | Laredo et al. |
| 8,626,137 B1 | 1/2014 | Devitt et al. |
| 8,635,226 B2 | 1/2014 | Chang et al. |
| 8,644,489 B1 | 2/2014 | Noble et al. |
| 8,671,020 B1 | 3/2014 | Morrison et al. |
| 8,688,557 B2 | 4/2014 | Rose et al. |
| 8,738,739 B2 | 5/2014 | Makar et al. |
| 8,767,948 B1 | 7/2014 | Riahi et al. |
| 8,811,597 B1 | 8/2014 | Hackbarth et al. |
| 8,861,691 B1 | 10/2014 | De et al. |
| 8,869,245 B2 | 10/2014 | Ranganathan et al. |
| 8,898,219 B2 | 11/2014 | Ricci |
| 8,898,290 B2 | 11/2014 | Siemsgluess |
| 8,909,693 B2 | 12/2014 | Frissora et al. |
| 8,935,172 B1 | 1/2015 | Noble, Jr. et al. |
| 8,996,509 B1 | 3/2015 | Sundaram |
| 9,020,142 B2 | 4/2015 | Kosiba et al. |
| 9,026,431 B1 | 5/2015 | Moreno Mengibar et al. |
| 9,060,057 B1 | 6/2015 | Danis |
| 9,065,915 B1 | 6/2015 | Lillard et al. |
| 9,082,094 B1 | 7/2015 | Etter et al. |
| 9,100,483 B1 | 8/2015 | Snedden |
| 9,117,450 B2 | 8/2015 | Cook et al. |
| 9,123,009 B1 | 9/2015 | Etter et al. |
| 9,137,366 B2 | 9/2015 | Medina et al. |
| 9,152,737 B1 | 10/2015 | Micali et al. |
| 9,160,853 B1 | 10/2015 | Daddi et al. |
| 9,178,999 B1 | 11/2015 | Hegde et al. |
| 9,185,222 B1 | 11/2015 | Govindarajan et al. |
| 9,237,232 B1 | 1/2016 | Williams et al. |
| 9,280,754 B1 | 3/2016 | Schwartz et al. |
| 9,286,413 B1 | 3/2016 | Coates et al. |
| 9,300,801 B1 | 3/2016 | Warford et al. |
| 9,319,524 B1 | 4/2016 | Webster |
| 9,386,152 B2 | 7/2016 | Riahi et al. |
| 9,397,985 B1 | 7/2016 | Seger et al. |
| 9,426,291 B1 | 8/2016 | Ouimette et al. |
| 9,473,637 B1 | 10/2016 | Venkatapathy et al. |
| 9,514,463 B2 | 12/2016 | Grigg et al. |
| 9,595,049 B2 | 3/2017 | Showers et al. |
| 9,609,131 B2 | 3/2017 | Placiakis et al. |
| 9,674,361 B2 | 6/2017 | Ristock et al. |
| 9,679,265 B1 | 6/2017 | Schwartz et al. |
| 9,774,731 B1 | 9/2017 | Haltom et al. |
| 9,787,840 B1 | 10/2017 | Neuer, III et al. |
| 9,813,495 B1 | 11/2017 | Van et al. |
| 9,823,949 B2 | 11/2017 | Ristock et al. |
| 9,883,037 B1 | 1/2018 | Lewis et al. |
| 9,894,478 B1 | 2/2018 | Deluca et al. |
| 9,930,181 B1 | 3/2018 | Moran et al. |
| 9,955,021 B1 | 4/2018 | Liu et al. |
| RE46,852 E | 5/2018 | Petrovykh |
| 9,998,596 B1 | 6/2018 | Dunmire et al. |
| 10,009,465 B1 | 6/2018 | Fang et al. |
| 10,038,788 B1 | 7/2018 | Khalatian |
| 10,044,862 B1 | 8/2018 | Cai et al. |
| 10,079,939 B1 | 9/2018 | Bostick et al. |
| 10,085,073 B2 | 9/2018 | Ray et al. |
| 10,101,974 B2 | 10/2018 | Ristock et al. |
| 10,115,065 B1 | 10/2018 | Fama et al. |
| 10,135,973 B2 | 11/2018 | Algard et al. |
| 10,154,138 B2 | 12/2018 | Te Booij et al. |
| 10,194,027 B1 | 1/2019 | Daddi et al. |
| 10,235,999 B1 | 3/2019 | Naughton et al. |
| 10,241,752 B2 | 3/2019 | Lemay et al. |
| 10,242,019 B1 | 3/2019 | Shan et al. |
| 10,276,170 B2 | 4/2019 | Gruber et al. |
| 10,277,745 B1 | 4/2019 | Araujo et al. |
| 10,290,017 B2 | 5/2019 | Traasdahl et al. |
| 10,331,402 B1 | 6/2019 | Spector et al. |
| 10,380,246 B2 | 8/2019 | Clark et al. |
| 10,440,180 B1 | 10/2019 | Jayapalan et al. |
| 10,445,742 B2 | 10/2019 | Prendki et al. |
| 10,460,728 B2 | 10/2019 | Anbazhagan et al. |
| 10,497,361 B1 | 12/2019 | Rule et al. |
| 10,554,590 B2 | 2/2020 | Cabrera-Cordon et al. |
| 10,554,817 B1 | 2/2020 | Sullivan et al. |
| 10,572,879 B1 | 2/2020 | Hunter et al. |
| 10,574,822 B1 | 2/2020 | Sheshaiahgari et al. |
| 10,601,992 B2 | 3/2020 | Dwyer et al. |
| 10,623,572 B1 | 4/2020 | Copeland |
| 10,635,973 B1 | 4/2020 | Dirac et al. |
| 10,636,425 B2 | 4/2020 | Naughton et al. |
| 10,699,303 B2 | 6/2020 | Ismail et al. |
| 10,715,648 B1 | 7/2020 | Vashisht et al. |
| 10,718,031 B1 | 7/2020 | Wu et al. |
| 10,728,384 B1 | 7/2020 | Channakeshava et al. |
| 10,735,586 B1 | 8/2020 | Johnston |
| 10,742,806 B2 | 8/2020 | Kotak |
| 10,750,019 B1 | 8/2020 | Petrovykh et al. |
| 10,783,568 B1 | 9/2020 | Chandra et al. |
| 10,789,956 B1 | 9/2020 | Dube |
| 10,803,865 B2 | 10/2020 | Naughton et al. |

(56) References Cited

U.S. PATENT DOCUMENTS

| | | |
|---|---|---|
| 10,812,654 B2 | 10/2020 | Wozniak |
| 10,812,655 B1 | 10/2020 | Adibi et al. |
| 10,827,069 B1 | 11/2020 | Paiva |
| 10,827,071 B1 | 11/2020 | Adibi et al. |
| 10,839,432 B1 | 11/2020 | Konig et al. |
| 10,841,425 B1 | 11/2020 | Langley et al. |
| 10,855,844 B1 | 12/2020 | Smith et al. |
| 10,861,031 B2 | 12/2020 | Sullivan et al. |
| 10,878,479 B2 | 12/2020 | Wu et al. |
| 10,943,589 B2 | 3/2021 | Naughton et al. |
| 10,970,682 B1 | 4/2021 | Aykin |
| 11,017,176 B2 | 5/2021 | Ayers et al. |
| 11,089,158 B1 | 8/2021 | Holland et al. |
| 2001/0008999 A1 | 7/2001 | Bull |
| 2001/0024497 A1 | 9/2001 | Campbell |
| 2001/0054072 A1 | 12/2001 | Discolo et al. |
| 2002/0019737 A1 | 2/2002 | Stuart et al. |
| 2002/0029272 A1 | 3/2002 | Weller |
| 2002/0034304 A1 | 3/2002 | Yang |
| 2002/0038420 A1 | 3/2002 | Collins et al. |
| 2002/0067823 A1 | 6/2002 | Walker et al. |
| 2002/0143599 A1 | 10/2002 | Nourbakhsh et al. |
| 2002/0169664 A1 | 11/2002 | Walker et al. |
| 2002/0174182 A1 | 11/2002 | Wilkinson et al. |
| 2002/0181689 A1 | 12/2002 | Rupe et al. |
| 2003/0007621 A1 | 1/2003 | Graves et al. |
| 2003/0009520 A1 | 1/2003 | Nourbakhsh et al. |
| 2003/0032409 A1 | 2/2003 | Hutcheson et al. |
| 2003/0061068 A1 | 3/2003 | Curtis |
| 2003/0112927 A1 | 6/2003 | Brown et al. |
| 2003/0126136 A1 | 7/2003 | Omoigui |
| 2003/0167167 A1 | 9/2003 | Gong |
| 2004/0044585 A1 | 3/2004 | Franco |
| 2004/0044664 A1 | 3/2004 | Cash et al. |
| 2004/0062364 A1 | 4/2004 | Dezonno et al. |
| 2004/0078257 A1 | 4/2004 | Schweitzer et al. |
| 2004/0098274 A1 | 5/2004 | Dezonno et al. |
| 2004/0103051 A1 | 5/2004 | Reed et al. |
| 2004/0141508 A1 | 7/2004 | Schoeneberger et al. |
| 2004/0162724 A1 | 8/2004 | Hill et al. |
| 2004/0162753 A1 | 8/2004 | Vogel et al. |
| 2004/0174980 A1 | 9/2004 | Knott et al. |
| 2004/0215451 A1 | 10/2004 | Macleod |
| 2005/0033957 A1 | 2/2005 | Enokida |
| 2005/0043986 A1 | 2/2005 | Mcconnell et al. |
| 2005/0063365 A1 | 3/2005 | Mathew et al. |
| 2005/0071178 A1 | 3/2005 | Beckstrom et al. |
| 2005/0105712 A1 | 5/2005 | Williams et al. |
| 2005/0177368 A1 | 8/2005 | Odinak et al. |
| 2005/0226220 A1 | 10/2005 | Kilkki et al. |
| 2005/0228774 A1 | 10/2005 | Ronnewinkel |
| 2005/0246511 A1 | 11/2005 | Willman et al. |
| 2005/0271198 A1 | 12/2005 | Chin et al. |
| 2006/0095575 A1 | 5/2006 | Sureka et al. |
| 2006/0126818 A1 | 6/2006 | Berger et al. |
| 2006/0153357 A1 | 7/2006 | Acharya et al. |
| 2006/0166669 A1 | 7/2006 | Claussen |
| 2006/0188086 A1 | 8/2006 | Busey et al. |
| 2006/0209797 A1 | 9/2006 | Anisimov et al. |
| 2006/0215831 A1 | 9/2006 | Knott et al. |
| 2006/0229931 A1 | 10/2006 | Fligler et al. |
| 2006/0256953 A1 | 11/2006 | Pulaski et al. |
| 2006/0271361 A1 | 11/2006 | Vora et al. |
| 2006/0274856 A1 | 12/2006 | Dun et al. |
| 2006/0277108 A1 | 12/2006 | Altberg et al. |
| 2007/0016565 A1 | 1/2007 | Evans et al. |
| 2007/0036334 A1 | 2/2007 | Culbertson et al. |
| 2007/0038499 A1 | 2/2007 | Margulies et al. |
| 2007/0041519 A1 | 2/2007 | Erhart et al. |
| 2007/0061183 A1 | 3/2007 | Seetharaman et al. |
| 2007/0078725 A1 | 4/2007 | Koszewski et al. |
| 2007/0121902 A1 | 5/2007 | Stoica et al. |
| 2007/0121903 A1 | 5/2007 | Moore, Jr. et al. |
| 2007/0136284 A1 | 6/2007 | Cobb et al. |
| 2007/0155411 A1 | 7/2007 | Morrison |
| 2007/0157021 A1 | 7/2007 | Whitfield |
| 2007/0160188 A1 | 7/2007 | Sharpe et al. |
| 2007/0162296 A1 | 7/2007 | Altberg et al. |
| 2007/0198329 A1 | 8/2007 | Lyerly et al. |
| 2007/0201636 A1 | 8/2007 | Gilbert et al. |
| 2007/0211881 A1* | 9/2007 | Parker-Stephen .. H04M 3/5133 379/265.01 |
| 2007/0263810 A1 | 11/2007 | Sterns |
| 2007/0265990 A1 | 11/2007 | Sidhu et al. |
| 2007/0269031 A1 | 11/2007 | Honig et al. |
| 2007/0280460 A1 | 12/2007 | Harris et al. |
| 2007/0287430 A1 | 12/2007 | Hosain et al. |
| 2008/0002823 A1 | 1/2008 | Fama et al. |
| 2008/0043976 A1 | 2/2008 | Maximo et al. |
| 2008/0065902 A1 | 3/2008 | Spohrer et al. |
| 2008/0095355 A1 | 4/2008 | Mahalaha et al. |
| 2008/0126957 A1 | 5/2008 | Tysowski et al. |
| 2008/0205620 A1 | 8/2008 | Odinak et al. |
| 2008/0225872 A1 | 9/2008 | Collins et al. |
| 2008/0254774 A1 | 10/2008 | Lee |
| 2008/0255944 A1 | 10/2008 | Shah et al. |
| 2008/0260138 A1 | 10/2008 | Chen et al. |
| 2008/0288770 A1 | 11/2008 | Kline et al. |
| 2008/0300955 A1 | 12/2008 | Hamilton et al. |
| 2009/0018996 A1 | 1/2009 | Hunt et al. |
| 2009/0080411 A1 | 3/2009 | Lyman |
| 2009/0086945 A1 | 4/2009 | Buchanan et al. |
| 2009/0086949 A1 | 4/2009 | Caspi et al. |
| 2009/0086953 A1 | 4/2009 | Vendrow |
| 2009/0110182 A1 | 4/2009 | Knight, Jr. et al. |
| 2009/0171164 A1 | 7/2009 | Jung et al. |
| 2009/0222551 A1 | 9/2009 | Neely et al. |
| 2009/0228264 A1 | 9/2009 | Williams et al. |
| 2009/0234710 A1 | 9/2009 | Belgaied et al. |
| 2009/0234732 A1 | 9/2009 | Zorman et al. |
| 2009/0245479 A1 | 10/2009 | Surendran |
| 2009/0285384 A1 | 11/2009 | Pollock et al. |
| 2009/0306981 A1 | 12/2009 | Cromack et al. |
| 2009/0307052 A1 | 12/2009 | Mankani et al. |
| 2010/0106568 A1 | 4/2010 | Grimes |
| 2010/0114646 A1 | 5/2010 | Mcilwain et al. |
| 2010/0189250 A1 | 7/2010 | Williams et al. |
| 2010/0211515 A1 | 8/2010 | Woodings et al. |
| 2010/0235341 A1 | 9/2010 | Bennett |
| 2010/0250196 A1 | 9/2010 | Lawler et al. |
| 2010/0262549 A1 | 10/2010 | Kannan et al. |
| 2010/0266115 A1 | 10/2010 | Fedorov et al. |
| 2010/0266116 A1 | 10/2010 | Stolyar et al. |
| 2010/0274618 A1 | 10/2010 | Byrd et al. |
| 2010/0287131 A1 | 11/2010 | Church |
| 2010/0293033 A1 | 11/2010 | Hall et al. |
| 2010/0299268 A1 | 11/2010 | Guha et al. |
| 2010/0332287 A1 | 12/2010 | Gates et al. |
| 2011/0014932 A1 | 1/2011 | Estevez |
| 2011/0022461 A1 | 1/2011 | Simeonov |
| 2011/0071870 A1 | 3/2011 | Gong |
| 2011/0077994 A1 | 3/2011 | Segev et al. |
| 2011/0082688 A1 | 4/2011 | Kim et al. |
| 2011/0116618 A1 | 5/2011 | Zyarko et al. |
| 2011/0125697 A1 | 5/2011 | Erhart et al. |
| 2011/0143323 A1 | 6/2011 | Cohen |
| 2011/0182283 A1 | 7/2011 | Van et al. |
| 2011/0185293 A1 | 7/2011 | Barnett et al. |
| 2011/0216897 A1 | 9/2011 | Laredo et al. |
| 2011/0264581 A1 | 10/2011 | Clyne |
| 2011/0267985 A1 | 11/2011 | Wilkinson et al. |
| 2011/0286592 A1 | 11/2011 | Nimmagadda |
| 2011/0288897 A1 | 11/2011 | Erhart et al. |
| 2012/0046996 A1 | 2/2012 | Shah et al. |
| 2012/0051537 A1 | 3/2012 | Chishti et al. |
| 2012/0084217 A1 | 4/2012 | Kohler et al. |
| 2012/0087486 A1 | 4/2012 | Guerrero et al. |
| 2012/0095835 A1 | 4/2012 | Makar et al. |
| 2012/0109830 A1 | 5/2012 | Vogel |
| 2012/0257116 A1 | 10/2012 | Hendrickson et al. |
| 2012/0265587 A1 | 10/2012 | Kinkead |
| 2012/0290373 A1 | 11/2012 | Ferzacca et al. |
| 2012/0321073 A1 | 12/2012 | Flockhart et al. |
| 2013/0023235 A1 | 1/2013 | Fan et al. |

(56) References Cited

U.S. PATENT DOCUMENTS

| | | |
|---|---|---|
| 2013/0073361 A1 | 3/2013 | Silver |
| 2013/0085785 A1 | 4/2013 | Rogers et al. |
| 2013/0090963 A1 | 4/2013 | Sharma et al. |
| 2013/0124361 A1 | 5/2013 | Bryson |
| 2013/0136252 A1 | 5/2013 | Kosiba et al. |
| 2013/0223608 A1 | 8/2013 | Flockhart et al. |
| 2013/0223610 A1 | 8/2013 | Kohler et al. |
| 2013/0236002 A1 | 9/2013 | Jennings et al. |
| 2013/0257877 A1 | 10/2013 | Davis |
| 2013/0304581 A1 | 11/2013 | Soroca et al. |
| 2013/0325972 A1 | 12/2013 | Boston et al. |
| 2014/0012603 A1 | 1/2014 | Scanlon et al. |
| 2014/0016762 A1 | 1/2014 | Mitchell et al. |
| 2014/0039944 A1 | 2/2014 | Humbert et al. |
| 2014/0039962 A1 | 2/2014 | Nudd et al. |
| 2014/0067375 A1 | 3/2014 | Wooters |
| 2014/0079195 A1 | 3/2014 | Srivastava et al. |
| 2014/0079207 A1 | 3/2014 | Zhakov et al. |
| 2014/0099916 A1 | 4/2014 | Mallikarjunan et al. |
| 2014/0101261 A1 | 4/2014 | Wu et al. |
| 2014/0136346 A1 | 5/2014 | Teso |
| 2014/0140494 A1 | 5/2014 | Zhakov |
| 2014/0143018 A1 | 5/2014 | Nies et al. |
| 2014/0143249 A1 | 5/2014 | Cazzanti et al. |
| 2014/0161241 A1 | 6/2014 | Baranovsky et al. |
| 2014/0164502 A1 | 6/2014 | Khodorenko et al. |
| 2014/0177819 A1 | 6/2014 | Vymenets et al. |
| 2014/0188477 A1 | 7/2014 | Zhang |
| 2014/0200988 A1 | 7/2014 | Kassko et al. |
| 2014/0219132 A1 | 8/2014 | Delveaux et al. |
| 2014/0219438 A1 | 8/2014 | Brown et al. |
| 2014/0233719 A1 | 8/2014 | Vyemenets et al. |
| 2014/0244712 A1 | 8/2014 | Walters et al. |
| 2014/0254790 A1 | 9/2014 | Shaffer et al. |
| 2014/0257908 A1 | 9/2014 | Steiner et al. |
| 2014/0270108 A1 | 9/2014 | Riahi et al. |
| 2014/0270138 A1 | 9/2014 | Uba et al. |
| 2014/0270142 A1 | 9/2014 | Bischoff et al. |
| 2014/0270145 A1 | 9/2014 | Erhart et al. |
| 2014/0278605 A1 | 9/2014 | Borucki et al. |
| 2014/0278649 A1 | 9/2014 | Guerinik et al. |
| 2014/0279045 A1 | 9/2014 | Shottan et al. |
| 2014/0279050 A1 | 9/2014 | Makar et al. |
| 2014/0314225 A1 | 10/2014 | Riahi et al. |
| 2014/0335480 A1 | 11/2014 | Asenjo et al. |
| 2014/0372171 A1 | 12/2014 | Martin et al. |
| 2014/0379424 A1 | 12/2014 | Shroff |
| 2015/0006400 A1 | 1/2015 | Eng et al. |
| 2015/0010134 A1 | 1/2015 | Erel et al. |
| 2015/0012278 A1 | 1/2015 | Metcalf |
| 2015/0016600 A1 | 1/2015 | Desai et al. |
| 2015/0023484 A1 | 1/2015 | Ni et al. |
| 2015/0030151 A1 | 1/2015 | Bellini et al. |
| 2015/0030152 A1 | 1/2015 | Waxman et al. |
| 2015/0051957 A1 | 2/2015 | Griebeler et al. |
| 2015/0066632 A1 | 3/2015 | Gonzalez et al. |
| 2015/0071418 A1 | 3/2015 | Shaffer et al. |
| 2015/0078538 A1 | 3/2015 | Jain |
| 2015/0100473 A1 | 4/2015 | Manoharan et al. |
| 2015/0127400 A1 | 5/2015 | Chan et al. |
| 2015/0127441 A1 | 5/2015 | Feldman |
| 2015/0127677 A1 | 5/2015 | Wang et al. |
| 2015/0142704 A1 | 5/2015 | London |
| 2015/0172463 A1 | 6/2015 | Quast et al. |
| 2015/0178371 A1 | 6/2015 | Seth et al. |
| 2015/0195406 A1 | 7/2015 | Dwyer et al. |
| 2015/0213454 A1 | 7/2015 | Vedula |
| 2015/0215464 A1 | 7/2015 | Shaffer et al. |
| 2015/0222751 A1 | 8/2015 | Odinak et al. |
| 2015/0256677 A1 | 9/2015 | Konig et al. |
| 2015/0262188 A1 | 9/2015 | Franco |
| 2015/0262208 A1 | 9/2015 | Bjontegard et al. |
| 2015/0269377 A1 | 9/2015 | Gaddipati |
| 2015/0271334 A1 | 9/2015 | Wawrzynowicz |
| 2015/0281445 A1 | 10/2015 | Kumar et al. |
| 2015/0281449 A1 | 10/2015 | Milstein et al. |
| 2015/0281450 A1 | 10/2015 | Shapiro et al. |
| 2015/0281454 A1 | 10/2015 | Milstein et al. |
| 2015/0287410 A1 | 10/2015 | Mengibar et al. |
| 2015/0295788 A1 | 10/2015 | Witzman et al. |
| 2015/0296081 A1 | 10/2015 | Jeong |
| 2015/0334230 A1 | 11/2015 | Volzke |
| 2015/0339446 A1 | 11/2015 | Sperling et al. |
| 2015/0339620 A1 | 11/2015 | Esposito et al. |
| 2015/0339769 A1 | 11/2015 | Deoliveira et al. |
| 2015/0347900 A1 | 12/2015 | Bell et al. |
| 2015/0350429 A1 | 12/2015 | Kumar et al. |
| 2015/0350440 A1 | 12/2015 | Steiner et al. |
| 2015/0350443 A1 | 12/2015 | Kumar et al. |
| 2015/0379562 A1 | 12/2015 | Spievak et al. |
| 2016/0026629 A1 | 1/2016 | Clifford et al. |
| 2016/0034260 A1 | 2/2016 | Ristock et al. |
| 2016/0034995 A1 | 2/2016 | Williams et al. |
| 2016/0036981 A1 | 2/2016 | Hollenberg et al. |
| 2016/0036983 A1 | 2/2016 | Korolev et al. |
| 2016/0042419 A1 | 2/2016 | Singh |
| 2016/0042749 A1 | 2/2016 | Hirose |
| 2016/0055499 A1 | 2/2016 | Hawkins et al. |
| 2016/0057284 A1 | 2/2016 | Nagpal et al. |
| 2016/0065739 A1 | 3/2016 | Brimshan et al. |
| 2016/0080567 A1 | 3/2016 | Hooshiari et al. |
| 2016/0085891 A1 | 3/2016 | Ter et al. |
| 2016/0112867 A1 | 4/2016 | Martinez |
| 2016/0124937 A1 | 5/2016 | Elhaddad |
| 2016/0125456 A1 | 5/2016 | Wu et al. |
| 2016/0134624 A1 | 5/2016 | Jacobson et al. |
| 2016/0140627 A1 | 5/2016 | Moreau et al. |
| 2016/0150086 A1 | 5/2016 | Pickford |
| 2016/0155080 A1 | 6/2016 | Gnanasambandam et al. |
| 2016/0173692 A1 | 6/2016 | Wicaksono et al. |
| 2016/0180381 A1 | 6/2016 | Kaiser et al. |
| 2016/0191699 A1 | 6/2016 | Agrawal et al. |
| 2016/0191709 A1 | 6/2016 | Pullamplavil et al. |
| 2016/0191712 A1 | 6/2016 | Bouzid et al. |
| 2016/0234386 A1 | 8/2016 | Wawrzynowicz |
| 2016/0247165 A1 | 8/2016 | Ryabchun et al. |
| 2016/0261747 A1 | 8/2016 | Thirugnanasundaram et al. |
| 2016/0295018 A1 | 10/2016 | Loftus et al. |
| 2016/0300573 A1 | 10/2016 | Carbune et al. |
| 2016/0335576 A1 | 11/2016 | Peng |
| 2016/0349960 A1 | 12/2016 | Kumar et al. |
| 2016/0358611 A1 | 12/2016 | Abel |
| 2016/0360033 A1 | 12/2016 | Kocan |
| 2016/0378569 A1 | 12/2016 | Ristock et al. |
| 2016/0381222 A1 | 12/2016 | Ristock et al. |
| 2017/0004178 A1 | 1/2017 | Ponting et al. |
| 2017/0006135 A1 | 1/2017 | Siebel et al. |
| 2017/0006161 A9 | 1/2017 | Riahi et al. |
| 2017/0011311 A1 | 1/2017 | Backer et al. |
| 2017/0024762 A1 | 1/2017 | Swaminathan |
| 2017/0032436 A1 | 2/2017 | Disalvo et al. |
| 2017/0034226 A1 | 2/2017 | Bostick et al. |
| 2017/0068436 A1 | 3/2017 | Auer et al. |
| 2017/0068854 A1 | 3/2017 | Markiewicz et al. |
| 2017/0098197 A1 | 4/2017 | Yu et al. |
| 2017/0104875 A1 | 4/2017 | Im et al. |
| 2017/0111505 A1 | 4/2017 | Mcgann et al. |
| 2017/0111509 A1 | 4/2017 | McGann et al. |
| 2017/0116173 A1 | 4/2017 | Lev-Tov et al. |
| 2017/0118336 A1 | 4/2017 | Tapuhi et al. |
| 2017/0132536 A1 | 5/2017 | Goldstein et al. |
| 2017/0148073 A1 | 5/2017 | Nomula et al. |
| 2017/0155766 A1 | 6/2017 | Kumar et al. |
| 2017/0161439 A1 | 6/2017 | Raduchel et al. |
| 2017/0162197 A1 | 6/2017 | Cohen |
| 2017/0169325 A1 | 6/2017 | McCord et al. |
| 2017/0207916 A1 | 7/2017 | Luce et al. |
| 2017/0214795 A1 | 7/2017 | Charlson |
| 2017/0220966 A1 | 8/2017 | Wang |
| 2017/0223070 A1 | 8/2017 | Lin |
| 2017/0236512 A1 | 8/2017 | Williams et al. |
| 2017/0286774 A1 | 10/2017 | Gaidon |
| 2017/0288866 A1 | 10/2017 | Vanek et al. |
| 2017/0308794 A1 | 10/2017 | Fischerstrom |

(56) References Cited

U.S. PATENT DOCUMENTS

| | | |
|---|---|---|
| 2017/0316386 A1 | 11/2017 | Joshi et al. |
| 2017/0323344 A1 | 11/2017 | Nigul |
| 2017/0337578 A1 | 11/2017 | Chittilappilly et al. |
| 2017/0344754 A1 | 11/2017 | Kumar et al. |
| 2017/0344988 A1 | 11/2017 | Cusden et al. |
| 2017/0359421 A1 | 12/2017 | Stoops et al. |
| 2017/0372436 A1 | 12/2017 | Dalal et al. |
| 2018/0018705 A1 | 1/2018 | Tognetti |
| 2018/0032997 A1 | 2/2018 | Gordon et al. |
| 2018/0052664 A1 | 2/2018 | Zhang et al. |
| 2018/0053401 A1 | 2/2018 | Martin et al. |
| 2018/0054464 A1 | 2/2018 | Zhang et al. |
| 2018/0060830 A1 | 3/2018 | Abramovici et al. |
| 2018/0061256 A1 | 3/2018 | Elchik et al. |
| 2018/0077088 A1 | 3/2018 | Cabrera-Cordon et al. |
| 2018/0077250 A1 | 3/2018 | Prasad et al. |
| 2018/0097910 A1 | 4/2018 | D'Agostino et al. |
| 2018/0114234 A1 | 4/2018 | Fighel |
| 2018/0121766 A1 | 5/2018 | Mccord et al. |
| 2018/0137472 A1 | 5/2018 | Gorzela et al. |
| 2018/0137555 A1 | 5/2018 | Clausse et al. |
| 2018/0146093 A1 | 5/2018 | Kumar et al. |
| 2018/0150749 A1 | 5/2018 | Wu et al. |
| 2018/0152558 A1 | 5/2018 | Chan et al. |
| 2018/0165062 A1 | 6/2018 | Yoo et al. |
| 2018/0165691 A1 | 6/2018 | Heater et al. |
| 2018/0165692 A1 | 6/2018 | McCoy |
| 2018/0165723 A1 | 6/2018 | Wright et al. |
| 2018/0174198 A1 | 6/2018 | Wilkinson et al. |
| 2018/0189273 A1 | 7/2018 | Campos et al. |
| 2018/0190144 A1 | 7/2018 | Corelli et al. |
| 2018/0198917 A1 | 7/2018 | Ristock et al. |
| 2018/0205825 A1 | 7/2018 | Vymenets et al. |
| 2018/0248818 A1 | 8/2018 | Zucker et al. |
| 2018/0260857 A1 | 9/2018 | Kar et al. |
| 2018/0285423 A1 | 10/2018 | Ciano et al. |
| 2018/0286000 A1 | 10/2018 | Berry et al. |
| 2018/0293327 A1 | 10/2018 | Miller et al. |
| 2018/0293532 A1 | 10/2018 | Singh et al. |
| 2018/0300295 A1 | 10/2018 | Maksak et al. |
| 2018/0300641 A1 | 10/2018 | Donn et al. |
| 2018/0308072 A1 | 10/2018 | Smith et al. |
| 2018/0309801 A1 | 10/2018 | Rathod |
| 2018/0349858 A1 | 12/2018 | Walker et al. |
| 2018/0361253 A1 | 12/2018 | Grosso |
| 2018/0365651 A1 | 12/2018 | Sreedhara et al. |
| 2018/0367672 A1 | 12/2018 | Ristock et al. |
| 2018/0372486 A1 | 12/2018 | Farniok et al. |
| 2018/0376002 A1 | 12/2018 | Abraham |
| 2019/0013017 A1 | 1/2019 | Kang et al. |
| 2019/0028587 A1 | 1/2019 | Unitt et al. |
| 2019/0028588 A1 | 1/2019 | Shinseki et al. |
| 2019/0037077 A1 | 1/2019 | Konig et al. |
| 2019/0042988 A1 | 2/2019 | Brown et al. |
| 2019/0043106 A1 | 2/2019 | Talmor et al. |
| 2019/0058793 A1 | 2/2019 | Konig et al. |
| 2019/0104092 A1 | 4/2019 | Koohmarey et al. |
| 2019/0108834 A1 | 4/2019 | Nelson et al. |
| 2019/0130329 A1 | 5/2019 | Fama et al. |
| 2019/0132443 A1 | 5/2019 | Munns et al. |
| 2019/0146647 A1 | 5/2019 | Ramachandran et al. |
| 2019/0147045 A1 | 5/2019 | Kim |
| 2019/0172291 A1 | 6/2019 | Naseath |
| 2019/0180095 A1 | 6/2019 | Ferguson et al. |
| 2019/0180747 A1 | 6/2019 | Back et al. |
| 2019/0182383 A1 | 6/2019 | Shaev et al. |
| 2019/0196676 A1 | 6/2019 | Hillis et al. |
| 2019/0197568 A1 | 6/2019 | Li et al. |
| 2019/0205389 A1 | 7/2019 | Tripathi et al. |
| 2019/0236205 A1 | 8/2019 | Jia et al. |
| 2019/0238680 A1 | 8/2019 | Narayanan et al. |
| 2019/0253553 A1 | 8/2019 | Chishti |
| 2019/0258825 A1 | 8/2019 | Krishnamurthy |
| 2019/0287517 A1 | 9/2019 | Green et al. |
| 2019/0295027 A1 | 9/2019 | Dunne et al. |
| 2019/0306315 A1 | 10/2019 | Portman et al. |
| 2019/0335038 A1 | 10/2019 | Alonso Y Caloca et al. |
| 2019/0341030 A1 | 11/2019 | Hammons et al. |
| 2019/0342450 A1 | 11/2019 | Kulkarni et al. |
| 2019/0349477 A1 | 11/2019 | Kotak |
| 2019/0377789 A1 | 12/2019 | Jegannathan et al. |
| 2019/0378076 A1 | 12/2019 | O'Gorman et al. |
| 2019/0385597 A1 | 12/2019 | Katsamanis et al. |
| 2019/0386917 A1 | 12/2019 | Malin |
| 2019/0392357 A1 | 12/2019 | Surti et al. |
| 2019/0394333 A1 | 12/2019 | Jiron et al. |
| 2020/0005375 A1 | 1/2020 | Sharan et al. |
| 2020/0007680 A1 | 1/2020 | Wozniak |
| 2020/0012697 A1 | 1/2020 | Fan et al. |
| 2020/0012992 A1 | 1/2020 | Chan et al. |
| 2020/0019893 A1 | 1/2020 | Lu |
| 2020/0028968 A1 | 1/2020 | Mendiratta et al. |
| 2020/0050788 A1 | 2/2020 | Feuz et al. |
| 2020/0050996 A1 | 2/2020 | Generes, Jr. et al. |
| 2020/0058299 A1 | 2/2020 | Lee et al. |
| 2020/0076947 A1 | 3/2020 | Deole |
| 2020/0097544 A1 | 3/2020 | Alexander et al. |
| 2020/0104801 A1 | 4/2020 | Kwon et al. |
| 2020/0118215 A1 | 4/2020 | Rao et al. |
| 2020/0119936 A1 | 4/2020 | Balasaygun et al. |
| 2020/0125919 A1 | 4/2020 | Liu et al. |
| 2020/0126126 A1 | 4/2020 | Briancon et al. |
| 2020/0134492 A1 | 4/2020 | Copeland |
| 2020/0134648 A1 | 4/2020 | Qi et al. |
| 2020/0137097 A1 | 4/2020 | Zimmermann et al. |
| 2020/0154170 A1 | 5/2020 | Wu et al. |
| 2020/0160870 A1 | 5/2020 | Baughman et al. |
| 2020/0175478 A1 | 6/2020 | Lee et al. |
| 2020/0193335 A1 | 6/2020 | Sekhar et al. |
| 2020/0193983 A1 | 6/2020 | Choi |
| 2020/0211120 A1 | 7/2020 | Wang et al. |
| 2020/0218766 A1 | 7/2020 | Yaseen et al. |
| 2020/0219500 A1 | 7/2020 | Bender et al. |
| 2020/0242540 A1 | 7/2020 | Rosati et al. |
| 2020/0250272 A1 | 8/2020 | Kantor et al. |
| 2020/0250557 A1 | 8/2020 | Kishimoto et al. |
| 2020/0257996 A1 | 8/2020 | London |
| 2020/0280578 A1 | 9/2020 | Hearty et al. |
| 2020/0280635 A1 | 9/2020 | Barinov et al. |
| 2020/0285936 A1 | 9/2020 | Sen |
| 2020/0329154 A1 | 10/2020 | Baumann et al. |
| 2020/0336567 A1 | 10/2020 | Dumaine |
| 2020/0342868 A1 | 10/2020 | Lou et al. |
| 2020/0351375 A1 | 11/2020 | Lepore et al. |
| 2020/0351405 A1 | 11/2020 | Pace |
| 2020/0357026 A1 | 11/2020 | Liu et al. |
| 2020/0364507 A1 | 11/2020 | Berry |
| 2020/0365148 A1 | 11/2020 | Ji et al. |
| 2020/0395008 A1 | 12/2020 | Cohen et al. |
| 2020/0410506 A1 | 12/2020 | Jones et al. |
| 2021/0004536 A1 | 1/2021 | Adibi et al. |
| 2021/0005206 A1 | 1/2021 | Adibi et al. |
| 2021/0042839 A1 | 2/2021 | Adamec |
| 2021/0056481 A1 | 2/2021 | Wicaksono et al. |
| 2021/0067627 A1 | 3/2021 | Delker et al. |
| 2021/0081869 A1 | 3/2021 | Zeelig et al. |
| 2021/0081955 A1 | 3/2021 | Zeelig et al. |
| 2021/0082417 A1 | 3/2021 | Zeelig et al. |
| 2021/0082418 A1 | 3/2021 | Zeelig et al. |
| 2021/0084149 A1 | 3/2021 | Zeelig et al. |
| 2021/0089762 A1 | 3/2021 | Rahimi et al. |
| 2021/0091996 A1 | 3/2021 | Mcconnell et al. |
| 2021/0105361 A1 | 4/2021 | Bergher et al. |
| 2021/0124843 A1 | 4/2021 | Vass et al. |
| 2021/0125275 A1 | 4/2021 | Adibi |
| 2021/0133763 A1 | 5/2021 | Adibi et al. |
| 2021/0133765 A1 | 5/2021 | Adibi et al. |
| 2021/0134282 A1 | 5/2021 | Adibi et al. |
| 2021/0134283 A1 | 5/2021 | Adibi et al. |
| 2021/0134284 A1 | 5/2021 | Adibi et al. |
| 2021/0136204 A1 | 5/2021 | Adibi et al. |
| 2021/0136205 A1 | 5/2021 | Adibi et al. |
| 2021/0136206 A1 | 5/2021 | Adibi et al. |

(56) References Cited

U.S. PATENT DOCUMENTS

| | | | |
|---|---|---|---|
| 2021/0201244 A1 | 7/2021 | Sella et al. | |
| 2021/0201359 A1* | 7/2021 | Sekar | G06Q 30/0244 |
| 2022/0129905 A1 | 4/2022 | Sethumadhavan et al. | |

FOREIGN PATENT DOCUMENTS

| | | |
|---|---|---|
| WO | 2006/037836 A1 | 4/2006 |
| WO | 2012/024316 A2 | 2/2012 |
| WO | 2015/099587 A1 | 7/2015 |
| WO | 2019142743 A1 | 7/2019 |

OTHER PUBLICATIONS

Fan et al., "Demystifying Big Data Analytics for Business Intelligence Through the Lens of Marketing Mix", Big Data Research, vol. 2, Issue 1, Mar. 1, 2015, 16 pages.

An et al,, Towards Automatic Persona Generation Using Social Media Aug. 1, 2016, 2016 IEEE 4th International Conference on Future Internet of Things and Cloud Workshops (FiCloudW), 2 pages.

Bean-Mellinger, Barbara., "What Is the Difference Between Marketing and Advertising?", available on Feb. 12, 2019, retrieved from https://smallbusiness.chron .com/difference-between-marketing-advertising-2504 7 .html, Feb. 12, 2019, 6 pages.

Twin, Alexandra., "Marketing", URL: https://www.investopedia.com/lerms/m/marketing.asp, Mar. 29, 2019, 5 pages.

dictionary.com, "Marketing", URL: https://www.dictionary.com/browse/marketing, Apr. 6, 2019, 7 pages.

Ponn et al., "Correlational Analysis between Weather and 311 Service Request Volume", eil.mie.utoronto.ca., Jan. 1, 2017, 16 pages.

Zhang et al., "A Bayesian approach for modeling and analysis of call center arrivals", Jan. 1, 2013 Winter Simulations Conference (WSC), ieeexplore.ieee.org, pp. 713-723.

Mehrotra et al., "Call Center Simulation Modeling: Methods, Challenges, and Opportunities", Proceedings of the 2003 Winter Simulation Conference, vol. 1, Jan. 1, 2003, pp. 135-143.

Mandelbaum et al., "Staffing Many-Server Queues with Impatient Customers: Constraint Satisfaction in Call Center", Operations Research, Sep.- Oct. 2009, vol. 57, No. 5 (Sep. 1-Oct. 2009), pp. 1189-1205.

Fukunaga et al., "Staff Scheduling for Inbound Call Centers and Customer Contact Centers", AI Magazine, Winter, vol. 23, No. 4, Jan. 1, 2002, pp. 30-40.

Feldman et al., "Staffing of Time-Varying Queues to Achieve Time-Stable Performance", Management Science, Feb. 1, 2008, vol. 54, No. 2, Call Center Management, pp. 324-338.

Business Wire, "Rockwell SSD announces Call Center Simulator", Feb. 4, 1997, 4 pages.

Nathan, Stearns., "Using skills-based routing to the advantage of your contact center", Customer Inter@ction Solutions, Technology Marketing Corporation, May 1, 2001, vol. 19 No. 11, pp. 54-56.

Aksin et al., "The Modern Call Center: A Multi-Disciplinary Perspective on Operations Management Research", Production and Operations Management, 2007, vol. 16, No. 6, pp. 665-688.

Aldor-Noiman, et al., "Workload forecasting for a call center: Methodology and a case study." The Annals of Applied Statistics 3.4 (2009); 1403-1447.

Buesing et al., "Getting the Best Customer Service from your IVR: Fresh eyes on an old problem," [online] McKinsey and Co., published on Feb. 1, 2019, available at: < https://www.nnckinsey.conn/business-functions/operations/our-insights/ getting-the-best-customer-service-from-your-ivr-fresh-eyes . . . (Year: 2019).

Chiu et al., "A multi-agent infrastructure for mobile workforce management in a service oriented enterprise", Proceedings of the 38th annual Hawaii international conference on system sciences, IEEE, 2005, pp. 10.

Data Warehousing in the Age of Big Data, Krishnan, 2013, Morgan Kaufmann, Chapter 5.

Diimitrios et al., "An overview of workflow management: From process modeling to workflow automation infrastructure," Distributed and parallel Databases, 1995, vol. 3, No. 2 pp. 119-153.

Ernst et al. "An Annotated Bibliography of Personnel Scheduling and Rostering", CSIRO Mathematical and Information Sciences, 2003, 155 pages.

Ernst et al.,"Staff scheduling and rostering: A review of applications, methods and models," European Journal of Operational Research, 2004, vol. 153, pp. 3-27.

Federal Register, vol. 72, No. 195, Oct. 10, 2007, pp. 57526-57535.
Federal Register, vol. 75, No. 169, Sep. 1, 2010, pp. 53643-53660.
Federal register, vol. 79, No. 241 issued on Dec. 16, 2014, p. 74629, col. 2, *Gottschalk* v. *Benson*.
Federal Register, vol. 84, No. 4, Jan. 7, 2019, pp. 50-57.
Federal Register, vol. 84, No. 4, Jan. 7, 2019, p. 53-55.

Grefen et al., "A reference architecture for workflow management systems", Data & Knowledge Engineering, 1998, vol. 27, No. 1, pp. 31-57.

Huang et al., "Agent-based workflow management in collaborative product development on the Internet", Computer-Aided Design, 2000, vol. 32, No. 2, pp. 133-144.

Janarthanam, "Hands on Chatbots and conversational UI development: Build chatbots and voice user interfaces with Chatfuel, Dialogflow, Microsoft Bot Framework, Twilio, and Alexa Skills" Dec. 2017.

Koole, et al., "An overview of routing and staffing algorithms in multi-skill customer contact centers." 2006.

Myers et al., "At the Boundary of Workflow and AI", Proc. AAAI 1999 Workshop on Agent-Based Systems in The Business Context, 1999, 09 pages.

Niven, "Can music with prosocial lyrics heal the working world? A field intervention in a call center." Journal of Applied Social Psychology, 2015; 45(3), 132-138. doi:10.1111/jasp.12282).

On Hold Marketing, "Growing Your Business with Customized on-Hold Messaging" (Published on Apr. 5, 2018 at https://adhq.com/about/ad-news/growing-your-business-with-customized-on-hold-messaging) (Year: 2018).

U.S. Appl. No. 16/668,214, NFOA mailed Nov. 10, 2021.
U.S. Appl. No. 16/668,215, NFOA mailed Dec. 7, 2021.

Van Den Bergh et al. "Personnel scheduling: A literature review", European journal of operational research, 2013, vol. 226, No. 3 pp. 367-385.

United States Patent and Trademark Office, Non-Final Office Action for U.S. Appl. No. 16/550,961 dated Mar. 2, 2020.

United States Patent and Trademark Office, Final Office Action for U.S. Appl. No. 16/550,961 dated Jun. 17, 2020.

* cited by examiner

Structured Streaming processing modes: Micro-batch and Continuous Processing

METHOD AND APPARATUS FOR AUTOMATICALLY TAKING ACTION BASED ON THE CONTENT OF CALL CENTER COMMUNICATIONS

BACKGROUND

Contact centers, also referred to as "call centers", in which agents are assigned to queues based on skills and customer requirements are well known. FIG. 1 is an example system architecture 100, of a cloud-based contact center system 100. Customers 110 interact with a contact center system 150 using, for example, voice, email, text, and web interfaces to communicate with the agents 120 through a network 130 and at least one or more of text, voice or multimedia channels. The platform that controls the operation of the contact center 150 including the routing and handling of communications between customers 110 and agents 120 for the contact center 150 is referred herein as the contact routing system 153. The contact routing system 153 could be any of a contact center as a service (CCaS) system, an automated call distributor (ACD) system, or a case system, for example.

The agents 120 may be remote from the contact center 150 and handle communications (also referred to as "interactions" or "calls" herein) with customers 110 on behalf of an enterprise. The agents 120 may utilize devices, such as but not limited to, workstations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network (LAN). The network types are provided by way of example and are not intended to limit types of networks used for communications.

The agents 120 may be assigned to one or more queues representing call categories and/or agent skill levels. The agents 120 assigned to a queue may handle communications that are placed in the queue by the contact routing system 153. For example, there may be queues associated with a language (e.g., English or Chinese), topic (e.g., technical support or billing), or a particular country of origin. When a communication is received by the contact routing system 153, the communication may be placed in a relevant queue, and one of the agents 120 associated with the relevant queue may handle the communication.

Agents may be assigned to one or more entities using the cloud-based contact center. Therefore, it is possible that agents, on any given day or shift, are providing support/service for customers of various entities. For example, an agent may handle a communication from a customer of a computer supplier and then immediately thereafter handle a communication from a customer of an automobile company. Accordingly, agents might not be trained in all aspects of customer service for each entity. The term "customer", as used herein, refers to the party contacting the call center for support or other information and includes actual customers, potential customers, or any other party contacting the call center. Further, agents may be employees of the call center provider, employees of the entity using the call center service, contractors, or freelancers. Therefore, in order to provide a high level of service, it is important to be able to take various actions in real time, such as provide the agent with information or notify a supervisor, based on the content and sentiment of a communication from a customer. Known call center systems are not able to reliably detect the need for taking actions in an automated manner in real-time.

SUMMARY OF THE INVENTION

The disclosed implementations can leverage combined data streams relating to communications, historical data, Natural Language Processing (NLP), and future looking Machine Learning (ML) models to predict possible events and/or automatically take actions in a call center. A first aspect of the invention is a method for executing actions related to communications received in a call center, the method comprising: aggregating data from multiple data sources into a combined data stream, at least a first data source of the multiple data sources being a source of data corresponding to at least one communication processed by the call center and at least a second data source of the multiple data sources being a source of external data, wherein the external data is data representing activity that is external to the call center; processing the combined data stream into successive batches of data corresponding to one or more communications between a call center agent and a communicating party received by the call center; applying a sensor data structure defining at least one rule to the batches of data, wherein the at least one rule includes a machine learning model and a configuration data structure based on historical data from the multiple data sources; determining that at least one of the batches satisfies the at least one rule and generating a notification message relating to the one or more communications in response to the determining; and the call center executing an action based on the notification message, wherein the action addresses a situation corresponding the at least one communication.

BRIEF DESCRIPTION OF THE DRAWINGS

The foregoing summary, as well as the following detailed description of the invention, will be better understood when read in conjunction with the appended drawings. For the purpose of illustrating the invention, there are shown in the appended drawings various illustrative embodiments. It should be understood, however, that the invention is not limited to the precise arrangements and instrumentalities shown. In the drawings.

DETAILED DESCRIPTION

Figure 1:
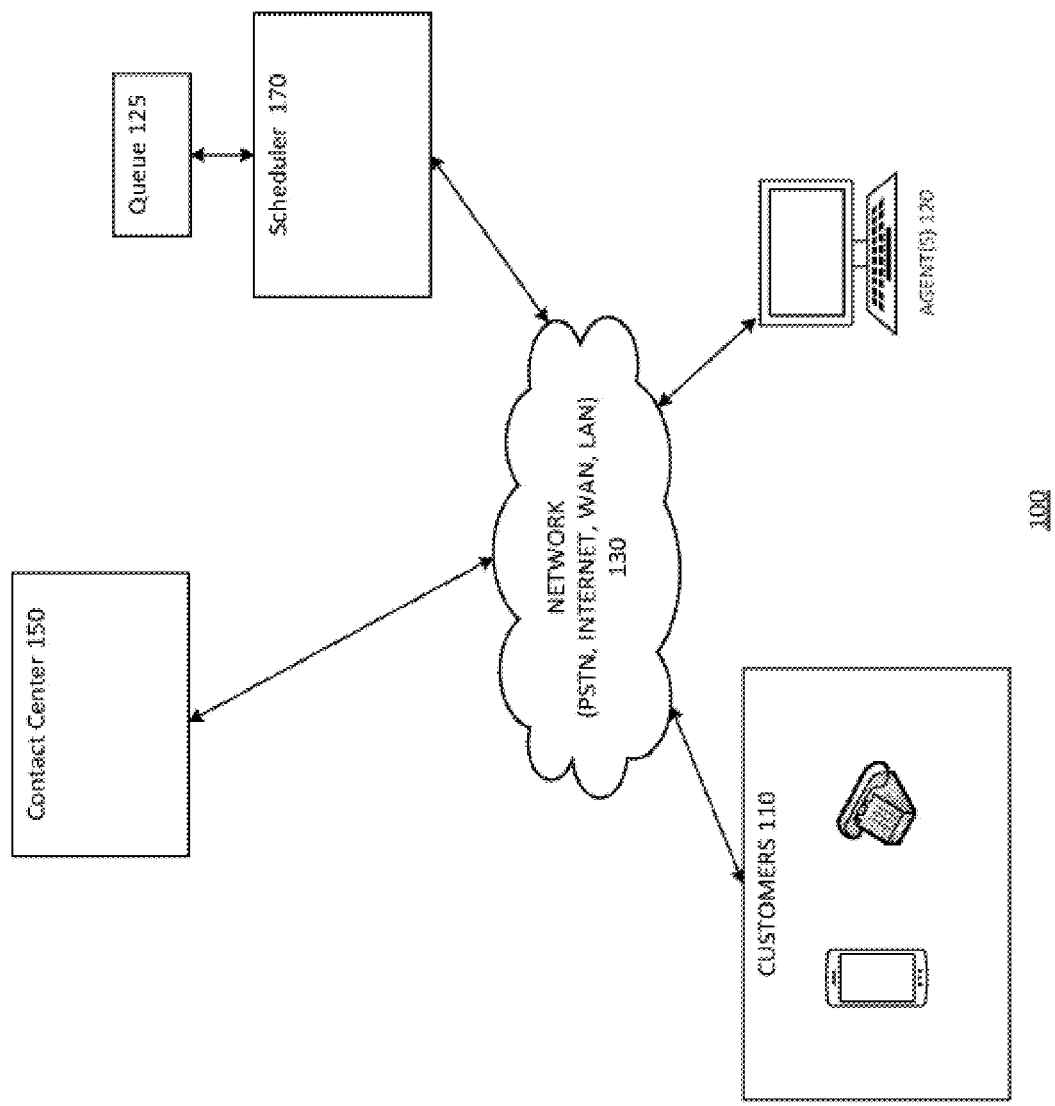
FIG. 1 is an architectural diagram of a conventional cloud based contact center computing environment.
Figure 2:
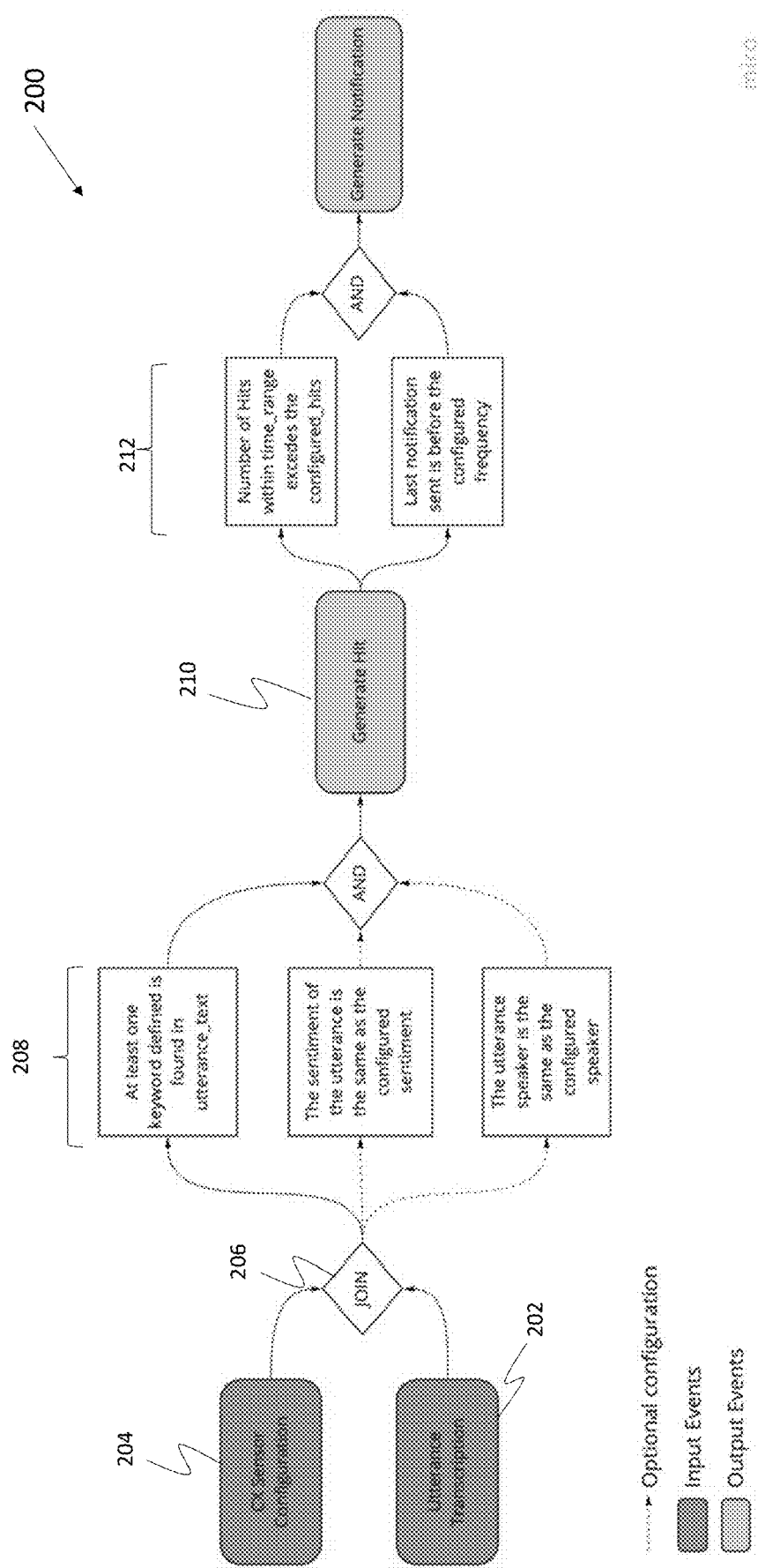
FIG. 2 is a diagram of pipeline data processing in accordance with disclosed implementations.

FIG. 2 illustrates a data pipeline 200 of a disclosed implementation. The pipeline 200 of this example processes two types of datasets: utterance data 202 and "sensor" configuration data 204. Utterance data 202 is derived from communications between agents and customers, as described in more detail below. Sensor configuration data represents conditions under which events (also referred to as "hits" herein) should be generated, also as described in greater detail below. Pipeline 200 can use a Machine Learning model, from the Spark NLP library for example, to compute a sentiment for communications. The sentiment can be included in the utterance data. Additionally, the pipeline can generate timestamps for the generation of hit and notification events. The term "sensor" as used herein includes data structures and processing models that can be applied to data streams and which set forth rules for generating an event.

Sensor configuration data 202 includes conditions under which an event is to be generated, such as key words, sentiment, frequency of key words, and the like. Sensor configuration data can also include an account identification or other identification data of the customer, entity, and/or call center. Sensor configuration data can also include a sensor name, applicable time ranges, and a time stamp. An example schema for sensor data is set forth below.

SensorConfigurations(
account_id: String,
active: Boolean,
configured_hits: Integer,
filter: (
keywords: Array[String],
sentiment: String
),
frequency: String,
sensor_id: String,
sensor_name: String,
time_range: String
timestamp: Timestamp,
)

Utterance data 204 is collected and derived from the content of communications between customers and agents. For example, a transcription of the communication (a phone call for example) can be created by recording the communication and using known speech to text processing. The text can then be parsed to identify keywords and/or keyphrases (referred to collectively herein as "keywords"). The utterance data can also include sentiment data of a communication and other identifying metadata, as described further below. An example schema for sensor data is set forth below.

Utterance(
account_id: String,
agent_id: String,
channel_id: String,
id: String,
interaction_id: String,
text: String,
timestamp: Timestamp,
'type': String,
timestamp: Timestamp
)

Sensor configuration data 204 is delivered into pipeline 200 as a stream and can be stored in a Delta Table, such as a Databricks delta table created in Delta Lake. A delta table maintains an entry for each "sensor" describing the state of the sensor, including whether it is active or inactive. Pipeline 200 continuously receives utterance information, such as transcriptions of communications, as data streams, as they are generated, by a speech-to-text service for example. Transcriptions can be processed in Spark Structured Streaming micro batches. In each batch, the sensor configuration table retrieves the configurations for active sensors. Active configurations are then joined with the transcription stream at 206 in FIG. 2.

Pipeline 200 matches a transcription and a configuration, at 208, when the transcription data contains at least one word specified as a key word in the sensor configuration. Additional filters can also be defined in the sensor. For example the filters can include:

a sentiment filter which selects only transcriptions with the sentiment—computed as described in the added sentiment metadata—specified in the sensor configuration; and/or a speaker filter which selects only transcriptions of utterances from the speaker specified in the sensor configuration This matching process yields a stream of transcription-configuration matches or hits at 210. These hits can be published to a Kafka topic, enabling a hit count of the sensor. The pipeline also keeps, for each active configuration, a count of the hits that fall within a user-defined time window, at 212, to trigger a notification event when hits fall within a user-defined maximum frequency. This count can be kept using a Spark state store functionality on top of a RocksDB, using the flatMapGroups. Pipeline 200 can publish a notification event to Kafka when the hit count for a sensor is greater or equal to the value set in the sensor's configuration within the intended time window (time_range), when the maximum frequency (frequency) is not violated, enabling a notification to the user or any other event/signal to be generated in order to take a desired action.

The pipeline outputs, hit events and notification events can be published to Kafka in json format with the following data structures:

SensorHits
account_id: String,
interaction_id: String,
sensor_id: String,
sensor_name: String,
speaker: String,
utterance_id: String,
utterance_started: Timestamp,
timestamp: Timestamp
)
SensorNotification
account_id: String,
sensor_id: String,
sensor_name: String,
time_range: String,
count: Integer,
timestamp: Timestamp
)

The disclosed implementations can leverage Spark Structured Streaming, the Apache Spark API that allows expression of computation on streaming data in the same way and in batch computation on static data. The data is treated as never ending tables on which queries or other processing can be performed. Queries and other processes can be performed on the tables continuously on new data as it arrives. Stateful transformations are also possible. This allows an SQL Engine to operate on data streams with a high throughput, high fault-tolerance, and high scalability. Each new record in a data stream can be stored as a new row in the corresponding table.

Figure 3:
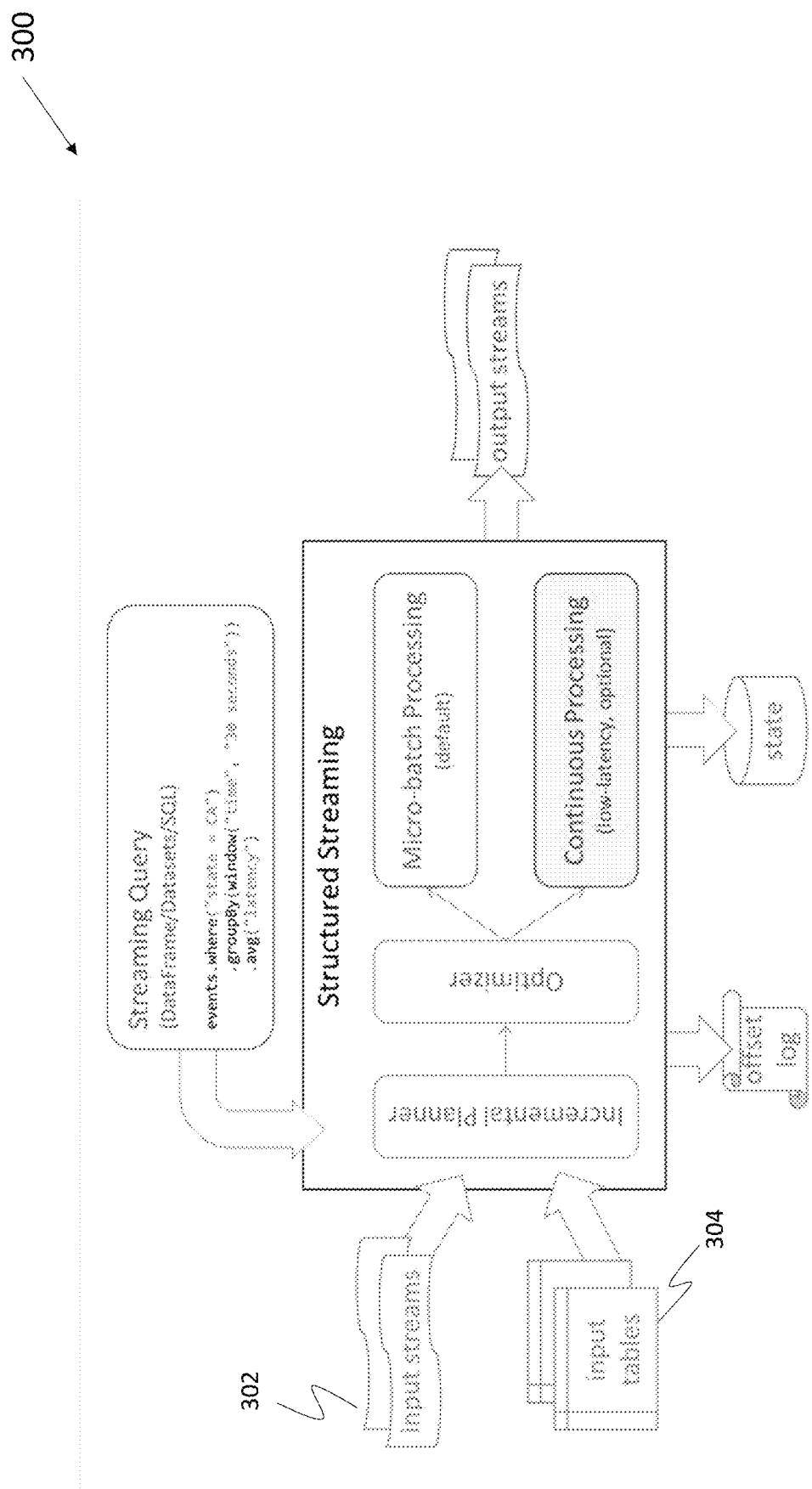
FIG. 3 is a diagram of structured streaming processing modes in accordance with disclosed implementations.

FIG. 3 illustrates micro-batch and continuous processing modes of a structured streaming architecture. Architecture 300 include input streams 302 and input tables 304.

Figure 4:
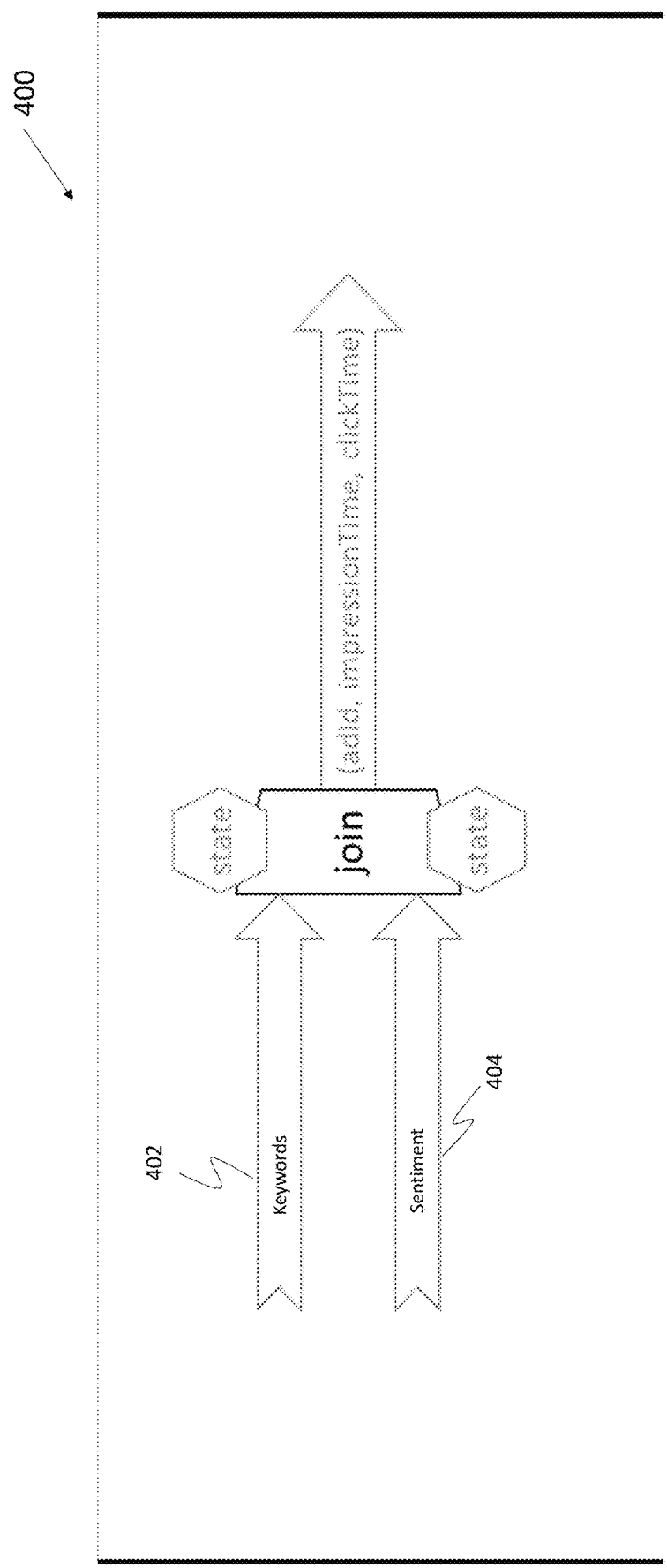
FIG. 4 is a diagram illustrating a stream join use case in accordance with disclosed implementations.

FIG. 4 illustrates an example 400 of joining data streams. In this example, data streams 402 and 404 are joined. As an example, data stream 402 could represent keywords and data stream 404 could represent sentiment. Each data stream is buffered to handle late/delayed data because corresponding events in data streams 402 and 404 could arrive out of order with arbitrary delays between them. Buffer size can be managed by dropping delayed data beyond a certain threshold. A joint time range condition is used to limit the time range of other events that each event can join against.

Figure 5:
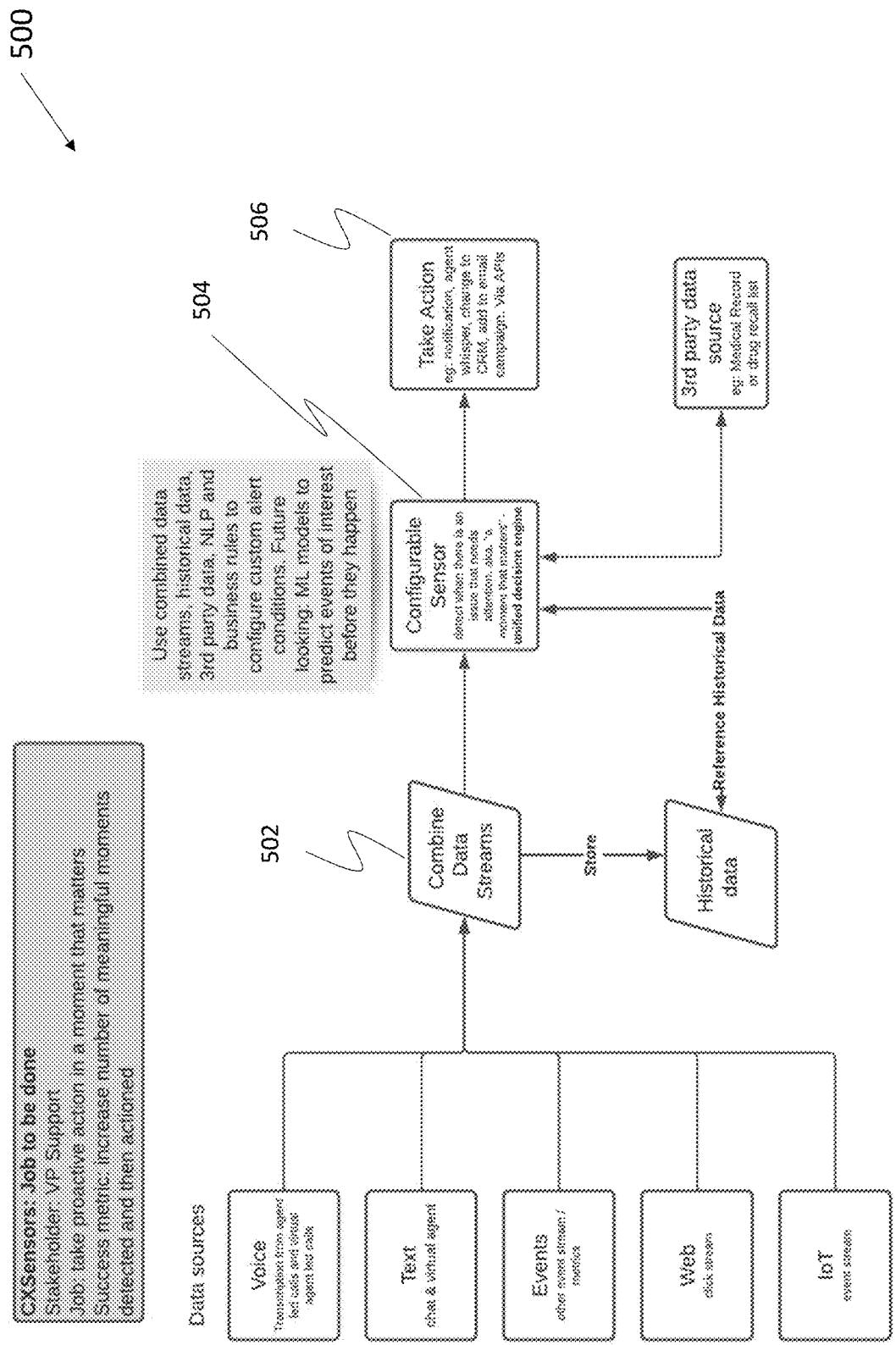
FIG. 5 is a block diagram of a process for creating an action in accordance with disclosed implementations.

FIG. 5 illustrates a more specific example of a process 500 for generating an action within a call center in accordance with disclosed implementations. At 502, disparate data streams from within and outside of the contact center are combined. It this example, the data streams include: voice, text (e.g., chat/sms/chatbot), arbitrary events, web events, IOT events, and stored historical data. At 504, a sensor is applied to the combined data streams. The sensor can be configured to define conditions to make a decision based on any of the metrics calculated, intents detected, keywords matched, or conditions recognized in the data streams. Intent data can be produced using known intent engines applied to the utterance data.

Predictive models can be used to predict a trigger condition based on past data. For example, if a customer was browsing kidney disease on a website for re predetermined time or number of visits over a period of time, has an overdue kidney prescription, and just called with intent matched "insurance bill", it can be predicted that there will be a sudden increase in medical payments for the customer (the "supervised event"). Once sensor conditions are triggered, then an action can be taken at 506. For example, the action can include a notification to an appropriate person or a call to a specified API. As an example, the API call could cause the customer to be adder to a "call immediately" list.

Figure 6:
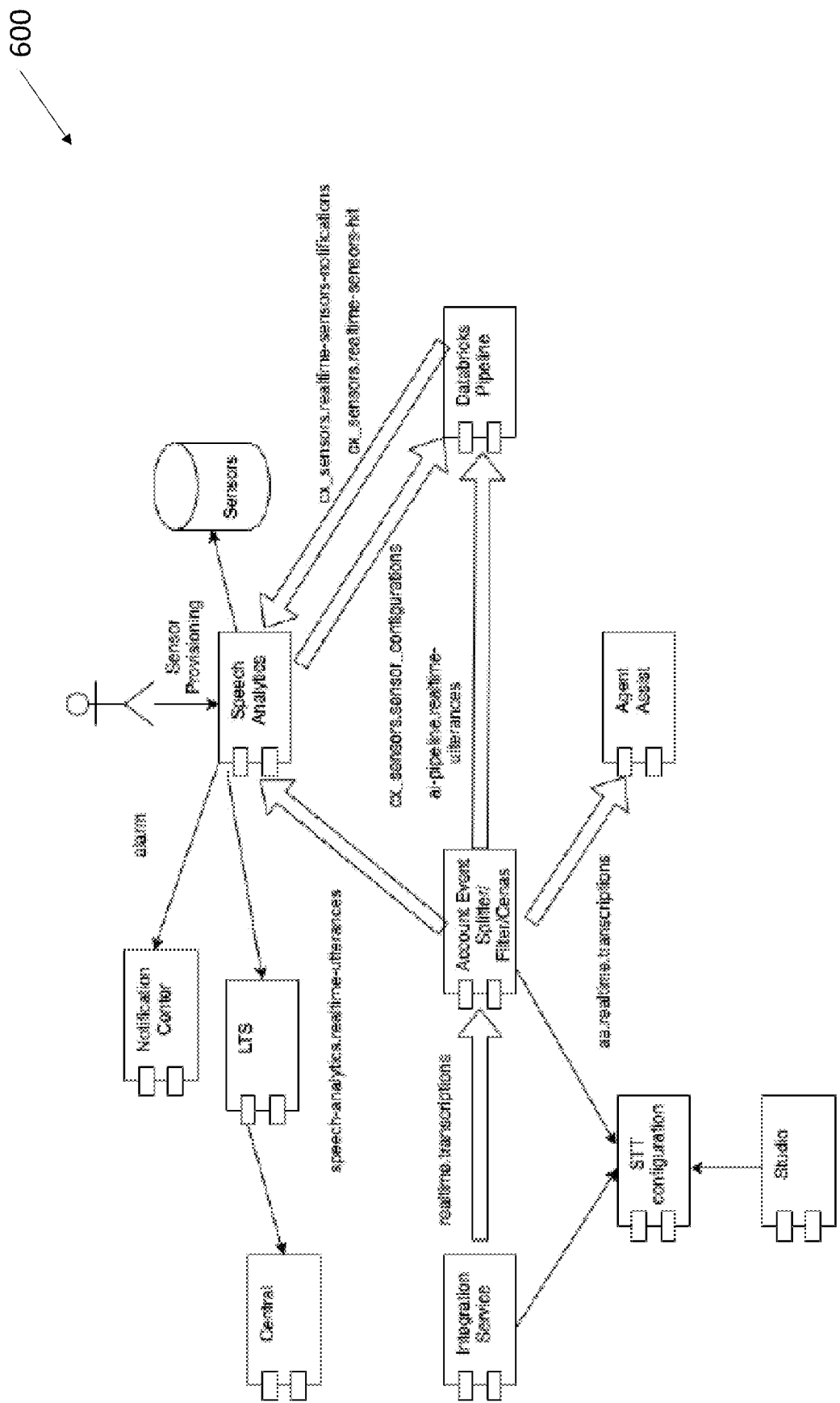
FIG. 6 illustrates a more detailed computing architecture for providing automated actions within a call center in accordance with disclosed implementations.

FIG. 6 illustrates and example of the overall architecture 600 of a system for automatically generating actions in a call center environment.

Figure 7A:
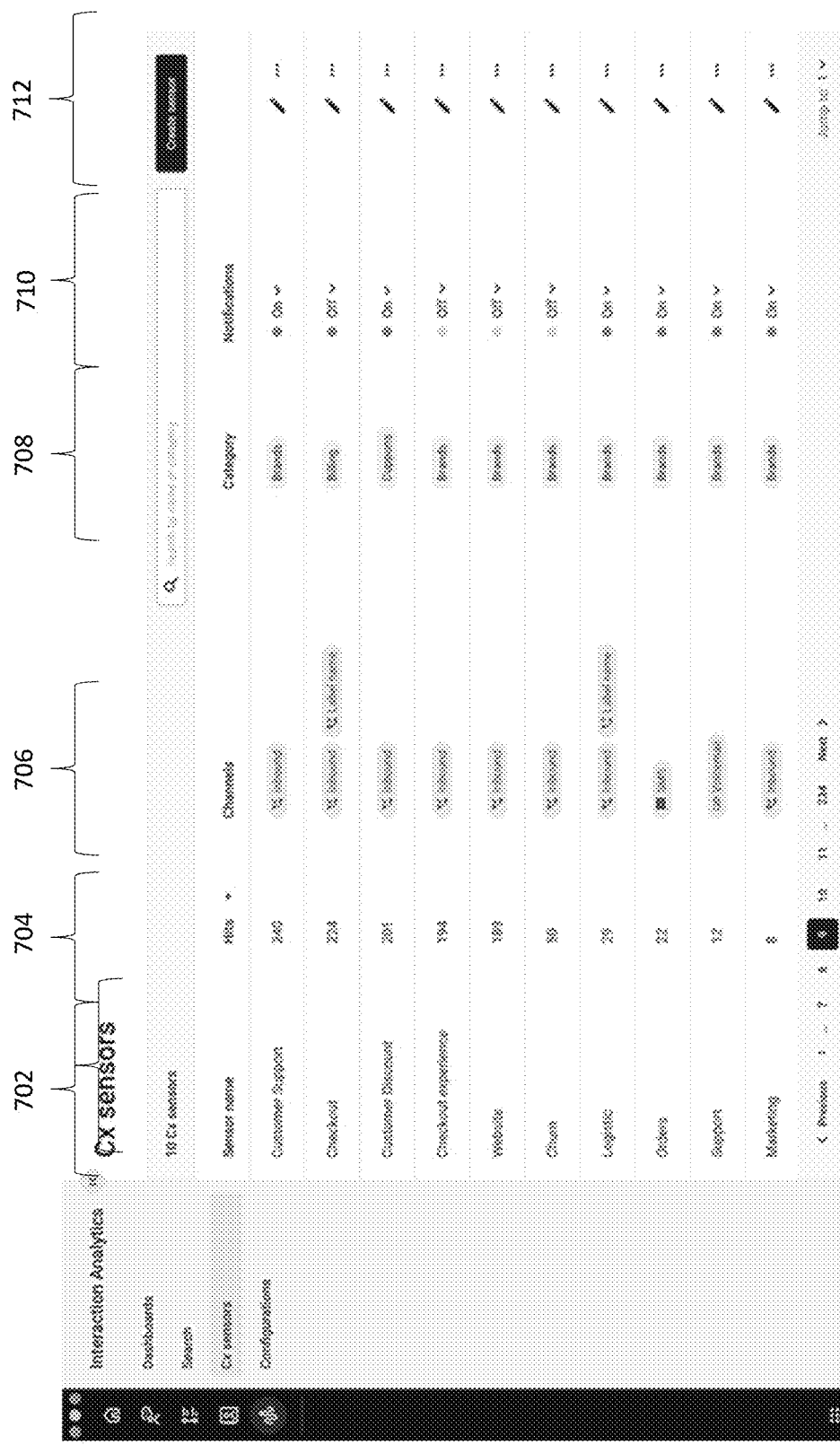
FIGS. 7A-7E illustrate a user interface in accordance with disclosed implementations.
Figure 7B:
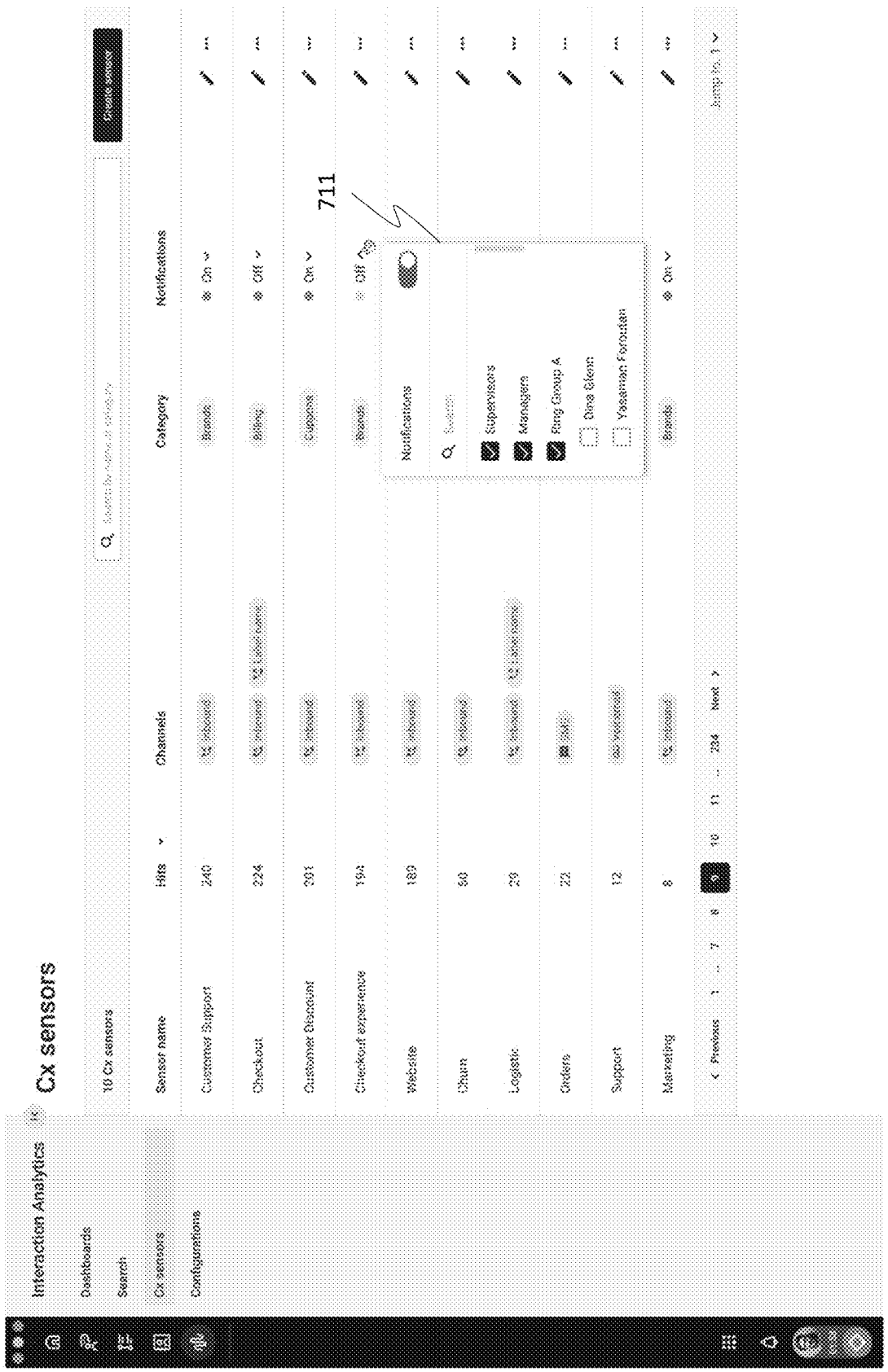

FIG. 7A illustrates a user interface for configuring and managing sensors. The various sensors, defined as the data structures described above, are displayed by name at column 702. Column 704 shows the total number of hits corresponding to the sensor. Column 706 shows the channels which the sensor is active. Column 708 shows a category of the sensor which can be used to organize and manage sensors. Column 710 indicates whether notifications for the sensor are currently activated (on) or not activated (off). Column 714 provides a selection tool for editing the corresponding sensor. FIG. 7B shows the popup user interface 711 of the UI when Notifications are selected. As shown, notifications can be turned on or off and persons, groups of persons, or APIs can be designated for receiving notifications.

Figure 7C:
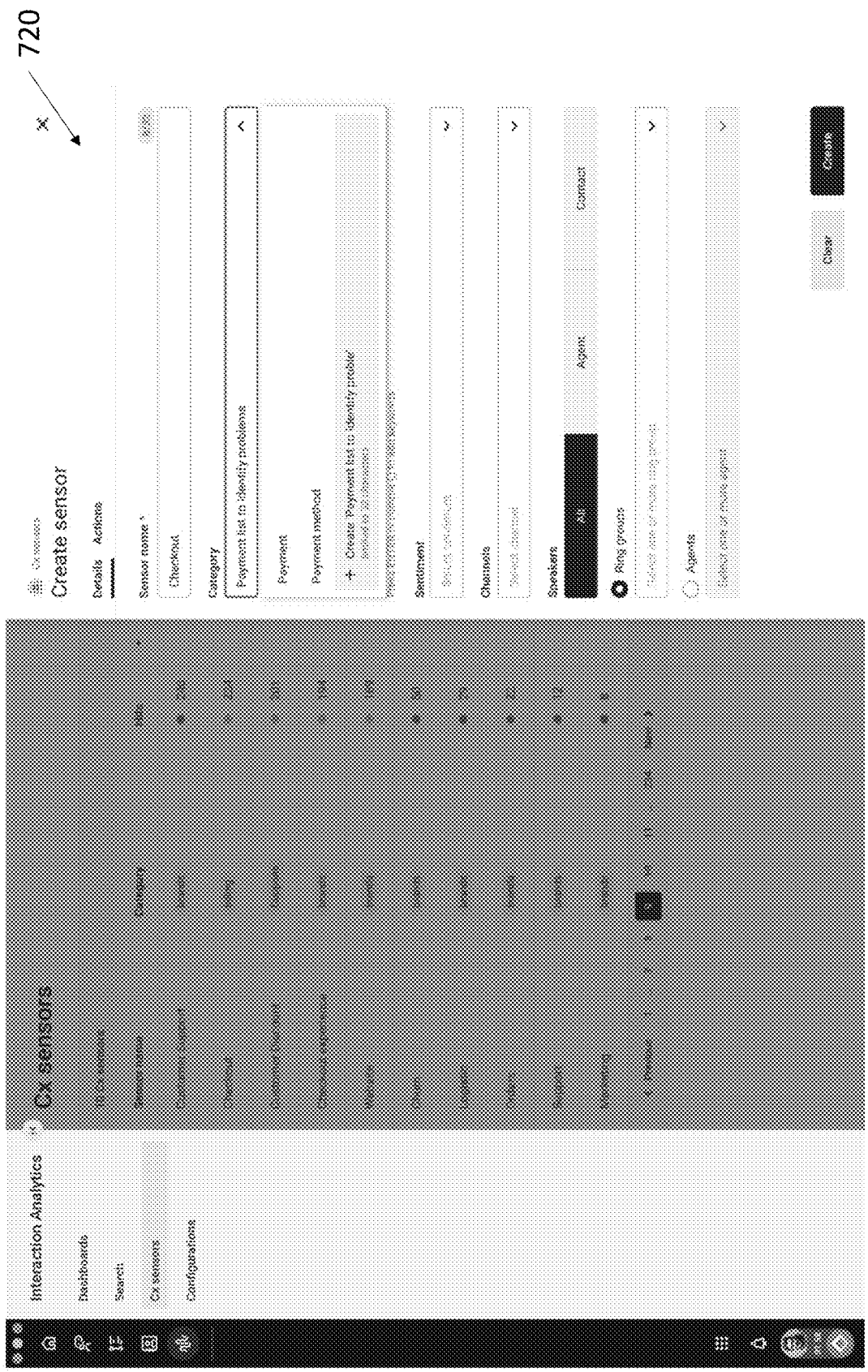
Figure 7D:
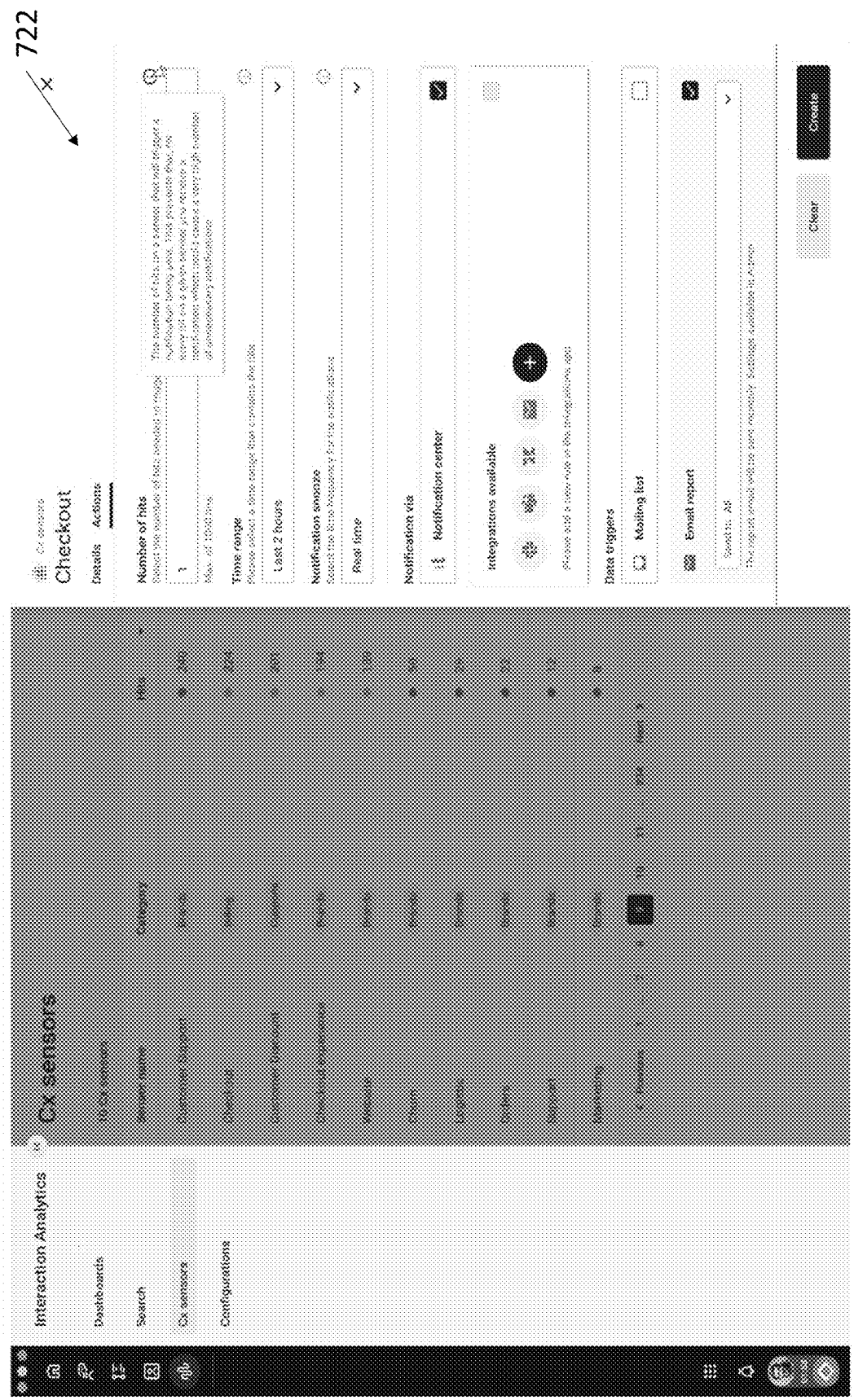
Figure 7E:
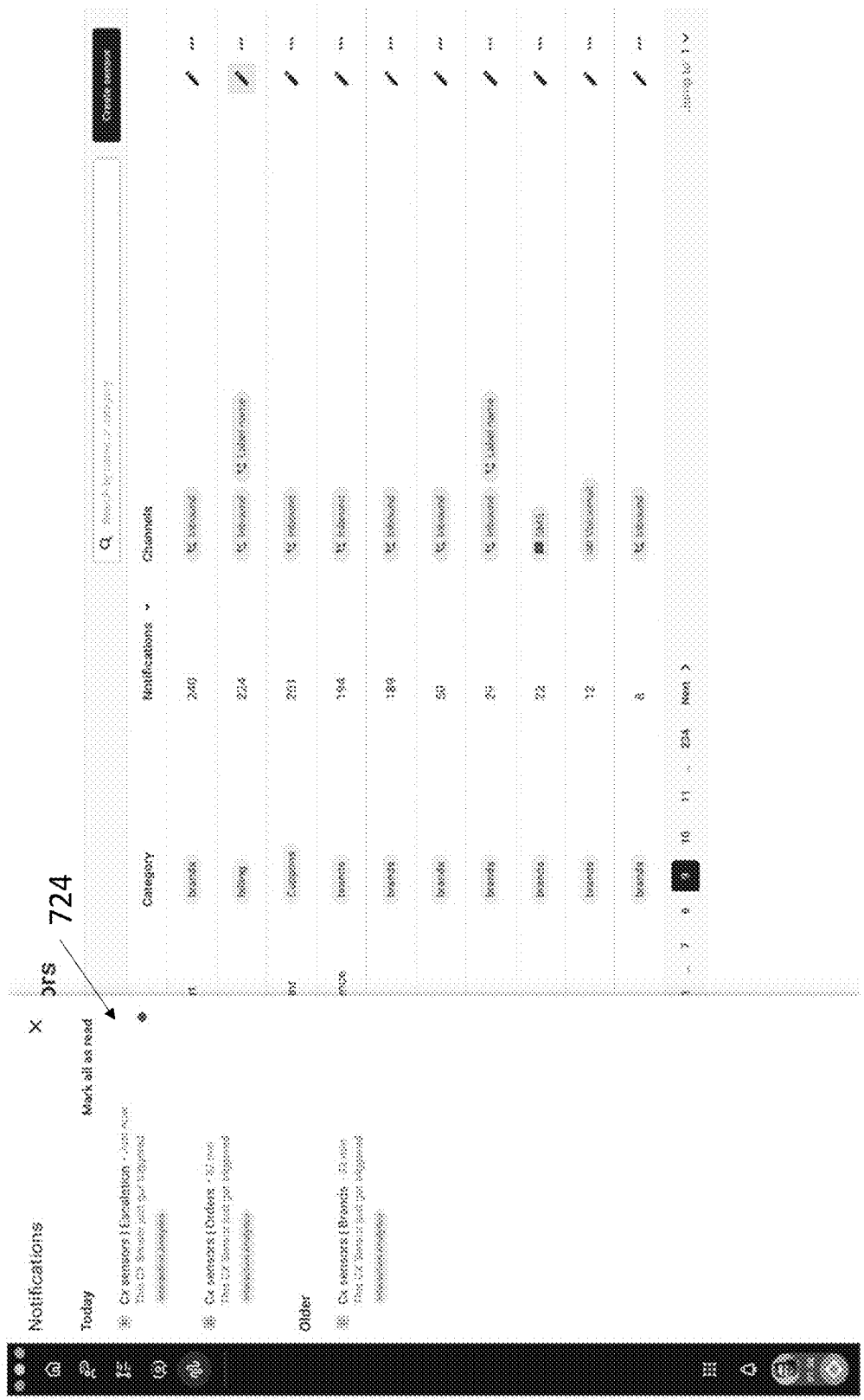

FIG. 7C illustrates the Create Sensor popup user interface 720. As illustrated in FIG. 7C, popup user interface 720 allows a user to enter a sensor name, a sensor category, a sentiment label, channels for which the sensor applies, speakers for which the sensor applies, ring groups for which the sensor applies, and agents for which the sensor applies. All of this data can be stored in the sensor data structure described above. FIG. 7D illustrates a Checkout popup user interface 722 which allows additional data to be specified and stored in the sensor data structure. User interface 722 allows entry of the number of hits in the sensor that will trigger a notification, the time range for the number of hits specified, time frequency of notifications for the sensor, a notification manner/channel (e.g., through a notification center of the call center, through email, etc.), available integrations, and data triggers specifying data outputs, such as email reports, API, calls and other data that results in desired actions. After entering all data/parameters, a selection of the Create button will cause the sensor to be created. FIG. 7E shows sensor notification report popup 724 which allows a user to view and manage sensor notifications.

Figure 8:
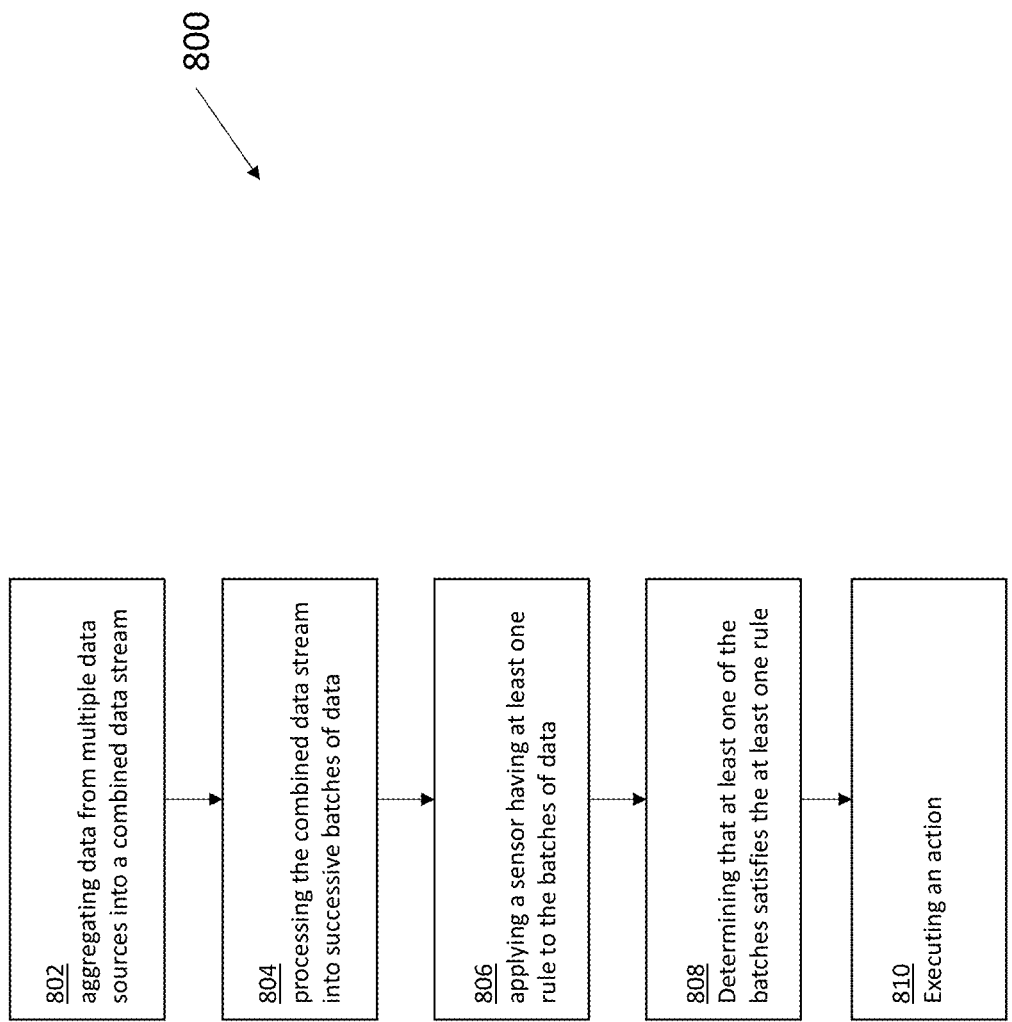
FIG. 8 illustrates method 800 of automatically executing an action within a call center environment in accordance with the disclosed implementations.

FIG. 8 illustrates method 800 of automatically executing an action within a call center environment in accordance with the disclosed implementations. Method 800 can be accomplished by the systems described above. At 802, data is aggregated from multiple data sources into a combined data stream. One of the data sources is a source of data corresponding to at least one communication processed by the call center one of the data sources can be a source of external data representing activity that is external to the call center. At 804, the combined data stream is processed into successive batches of data corresponding to one or more communications between a call center agent and a communicating party received by the call center. At 806, a sensor data structure specifying at least one rule is applied to the batches of data. The at least one rule can include a machine learning model and a configuration data structure based on historical data from the multiple data sources. At 808 it is determined that at least one of the batches satisfies the at least one rule and a notification message relating to the one or more communications is generated. At 810, the call center executes an action specified by the sensor data structure based on the notification message. The action can address a situation corresponding the at least one communication. As noted above, the actions can be various actions such as notifying a specified party, generating an API call, or the like.

It will be appreciated by those skilled in the art that changes could be made to the embodiments described above without departing from the broad inventive concept thereof. It is understood, therefore, that this invention is not limited to the particular implementations disclosed, but it is intended to cover modifications within the spirit and scope of the present invention as defined by the appended claims.

What is claimed:

1. A method for executing actions related to communications received in a call center, the method comprising:
   aggregating data from multiple data sources into a combined data stream, at least a first data source of the multiple data sources being a source of data corresponding to at least one communication processed by the call center and at least a second data source of the multiple data sources being a source of external data, wherein the external data is data representing activity that is external to the call center;
   processing the combined data stream into successive batches of data corresponding to one or more communications between a call center agent and a communicating party received by the call center;
   applying a sensor data structure defining at least one rule to the batches of data, wherein the at least one rule includes a machine learning model and a configuration data structure based on historical data from the multiple data sources;
   determining that at least one of the batches satisfies the at least one rule and generating a notification message relating to the one or more communications in response to the determining; and
   the call center executing an action based on the notification message, wherein the action addresses a situation corresponding the at least one communication.

2. The method of claim 1, wherein the configuration data structure is updated multiple times during the communication and the configuration data structure is a delta table.

3. The method of claim 2, wherein the configuration data structure includes a keyword, a frequency designation, a time range, and a flag threshold value indicator for each of the successive batches of data.

4. The method of claim 2, wherein applying at least one rule includes:
   comparing the batch of utterance data with the keyword and frequency designation; and
   generating a flag if the batch of utterance data satisfies criteria, the criteria including the batch of data containing the keyword at a frequency specified by the frequency designation.

5. The method of claim 4, wherein the configuration data structure further includes a speaker indicator and the criteria further includes that the keyword is uttered by a speaker specified by the speaker indicator.

6. The method of claim 1, wherein the action based on the notification message is at least one of:
   sending a notification to an agent;
   generating an API call;
   sending a notification to an agent supervisor;
   adding a party to an email campaign; and/or
   sending data to an external system.

7. The method of claim 1, wherein the first data source includes a source of voice and/or text data relating to communications processed by the call center.

8. The method of claim 1, wherein the second data source includes at least one of:
   a source of events occurring external to the call center;
   a web server; and/or
   at least one IoT device.

* * * * *